United States Patent
Gilbertson et al.

(10) Patent No.: US 9,827,678 B1
(45) Date of Patent: Nov. 28, 2017

(54) KINEMATIC DESIGN FOR ROBOTIC ARM

(71) Applicant: X Development LLC, Mountain View, CA (US)

(72) Inventors: Seth Gilbertson, Dublin, CA (US); Jeff Weber, San Francisco, CA (US); Robert Wilson, Pacifica, CA (US)

(73) Assignee: X Development LLC, Mountain View, CA (US)

( * ) Notice: Subject to any disclaimer, the term of this patent is extended or adjusted under 35 U.S.C. 154(b) by 59 days.

(21) Appl. No.: 15/155,388

(22) Filed: May 16, 2016

(51) Int. Cl.
| | |
|---|---|
| *G06F 19/00* | (2011.01) |
| *B25J 9/16* | (2006.01) |
| *B25J 19/00* | (2006.01) |
| *B25J 9/00* | (2006.01) |
| *B25J 11/00* | (2006.01) |

(Continued)

(52) U.S. Cl.
CPC ............. *B25J 9/1682* (2013.01); *A47L 11/24* (2013.01); *A47L 11/4011* (2013.01); *A47L 11/4055* (2013.01); *A47L 11/4061* (2013.01); *B25J 9/0087* (2013.01); *B25J 9/1694* (2013.01); *B25J 11/0085* (2013.01); *B25J 19/007* (2013.01); *Y10S 901/01* (2013.01); *Y10S 901/41* (2013.01)

(58) Field of Classification Search
CPC . B25J 5/00; B25J 11/0085; B25J 5/005; B25J 5/02; B25J 5/007; B25J 9/0006; B25J 9/009; Y10S 901/01; Y10S 901/41; Y10S 901/46; Y10S 414/124; Y10S 901/19; Y10S 901/27; G05B 2219/40295; G05B 2219/40296

USPC ............................ 700/245; 74/490, 490.01

See application file for complete search history.

(56) References Cited

U.S. PATENT DOCUMENTS

| | | | | |
|---|---|---|---|---|
| 1,480,623 A | * | 1/1924 | Liebmann | E02F 3/3486 414/397 |
| RE23,166 E | * | 11/1949 | Owen | E02F 3/342 37/304 |

(Continued)

FOREIGN PATENT DOCUMENTS

WO    WO2009074704 A1    6/2009

OTHER PUBLICATIONS

Notice of Allowance dated Aug. 30, 2017 in connection with U.S. Appl. No. 15/155,368.

(Continued)

*Primary Examiner* — Khoi Tran
*Assistant Examiner* — Jorge Peche
(74) *Attorney, Agent, or Firm* — McDonnell Boehnen Hulbert & Berghoff LLP

(57) ABSTRACT

An example robotic arm includes a base linkage and a first end effector connected to a second end of the base linkage through a first rotational joint. The robotic arm additionally includes a control arm. The control arm includes a first linkage and a second linkage, each having a first end and a second end. The first end of the first linkage is connected to the second end of the base linkage through a second rotational joint. The first end of the second linkage is connected to the second end of the first linkage through a third rotational joint. The control arm also includes a second end effector connected to the second end of the second linkage through a fourth rotational joint. The first, second, third, and fourth rotational joints are configured to rotate in or parallel to a first plane.

20 Claims, 13 Drawing Sheets

(51) Int. Cl.
*A47L 11/24* (2006.01)
*A47L 11/40* (2006.01)

(56) References Cited

U.S. PATENT DOCUMENTS

| | | | | |
|---|---|---|---|---|
| 3,148,791 A * | 9/1964 | Kampert | E02F 3/3411 | 414/707 |
| 3,254,781 A * | 6/1966 | Zink | E02F 3/3486 | 414/487 |
| 3,356,240 A * | 12/1967 | Zink | B60P 1/16 | 298/22 P |
| 3,369,679 A * | 2/1968 | Robinson | B60P 1/445 | 414/558 |
| 4,283,165 A * | 8/1981 | Vertut | B25J 5/007 | 280/771 |
| 4,865,514 A | 9/1989 | Tsuchihashi et al. | | |
| RE34,292 E * | 6/1993 | Bingman | B65F 3/08 | 294/86.4 |
| 5,807,056 A * | 9/1998 | Osborn | B65F 3/04 | 414/406 |
| 5,893,794 A * | 4/1999 | Togawa | H01L 21/67766 | 451/339 |
| 6,203,582 B1 * | 3/2001 | Berner | H01L 21/67173 | 29/25.01 |
| 6,266,901 B1 * | 7/2001 | Kanda | B66C 23/84 | 37/403 |
| 6,327,517 B1 * | 12/2001 | Sundar | H01L 21/681 | 318/560 |
| 6,394,740 B1 * | 5/2002 | Derby | B25J 9/042 | 414/744.1 |
| 6,656,017 B2 * | 12/2003 | Jackson | B08B 7/0092 | 134/10 |
| 7,346,428 B1 | 3/2008 | Huffman et al. | | |
| 7,836,811 B1 * | 11/2010 | Gardner | F41A 23/28 | 102/402 |
| 8,221,049 B1 * | 7/2012 | Westendorf | B66C 1/585 | 294/106 |
| 8,857,012 B2 | 10/2014 | Kim et al. | | |
| 8,892,253 B2 | 11/2014 | Park et al. | | |
| 8,958,911 B2 | 2/2015 | Wong et al. | | |
| 9,230,841 B2 | 1/2016 | Gilchrist et al. | | |
| 9,662,525 B2 * | 5/2017 | Lee | A63B 21/00181 | |
| 9,665,095 B1 * | 5/2017 | Romano | G05D 1/0038 | |
| 9,682,483 B1 * | 6/2017 | Romano | B25J 11/0085 | |
| 2005/0095096 A1 * | 5/2005 | Curotto | B65F 1/122 | 414/406 |
| 2005/0166413 A1 * | 8/2005 | Crampton | B25J 13/088 | 33/503 |
| 2006/0021408 A1 | 2/2006 | Hammar et al. | | |
| 2006/0212168 A1 * | 9/2006 | Baba | B25J 9/1689 | 700/245 |
| 2006/0228205 A1 * | 10/2006 | Trachet | B25J 17/0275 | 414/729 |
| 2006/0242775 A1 * | 11/2006 | Ho | A47L 11/33 | 15/41.1 |
| 2006/0283611 A1 * | 12/2006 | Wittkowski | E02F 3/02 | 172/817 |
| 2007/0048115 A1 * | 3/2007 | Fenelli | B60B 19/003 | 414/512 |
| 2007/0089260 A1 * | 4/2007 | Shinier | A47L 11/4013 | 15/320 |
| 2007/0239315 A1 * | 10/2007 | Sato | B25J 9/1612 | 700/245 |
| 2009/0170417 A1 * | 7/2009 | Janssen | A22C 21/0023 | 452/136 |
| 2010/0243344 A1 * | 9/2010 | Wyrobek | B25J 5/007 | 180/21 |
| 2010/0261411 A1 * | 10/2010 | Reinmoeller | B24B 17/00 | 451/5 |
| 2010/0292841 A1 * | 11/2010 | Wickham | B25J 9/1679 | 700/259 |
| 2011/0202175 A1 * | 8/2011 | Romanov | A47L 11/4011 | 700/250 |
| 2011/0238205 A1 | 9/2011 | Kemp et al. | | |
| 2012/0061155 A1 * | 3/2012 | Berger | B25J 5/007 | 180/21 |
| 2012/0152877 A1 * | 6/2012 | Tadayon | B25J 5/02 | 212/224 |
| 2013/0226341 A1 * | 8/2013 | Sturm | B25J 5/007 | 700/245 |
| 2013/0247829 A1 * | 9/2013 | Taneja | A01K 5/0114 | 119/51.11 |
| 2014/0031977 A1 * | 1/2014 | Goldenberg | B25J 9/08 | 700/245 |
| 2014/0144470 A1 * | 5/2014 | Sewell | B01F 3/04503 | 134/18 |
| 2014/0311271 A1 * | 10/2014 | Cao | B25J 9/0036 | 74/490.05 |
| 2014/0316308 A1 * | 10/2014 | Lee | A63B 21/4043 | 601/33 |
| 2014/0360305 A1 * | 12/2014 | Olds | B25J 15/0441 | 74/490.01 |
| 2015/0088300 A1 * | 3/2015 | Kilibarda | B05B 15/0225 | 700/186 |
| 2015/0104283 A1 | 4/2015 | Nogami et al. | | |
| 2015/0226369 A1 * | 8/2015 | Troy | F16M 11/18 | 180/2.1 |
| 2015/0336264 A1 * | 11/2015 | Berger | B25J 5/007 | 180/21 |
| 2016/0096653 A1 * | 4/2016 | Stratton | B65D 11/12 | 414/332 |
| 2016/0167227 A1 * | 6/2016 | Wellman | B25J 9/1612 | 700/259 |
| 2016/0199985 A1 * | 7/2016 | Ganninger | B44C 1/18 | 156/60 |
| 2016/0260161 A1 * | 9/2016 | Atchley | G06T 7/593 | |
| 2017/0023947 A1 * | 1/2017 | McMillion | B64D 1/22 | |
| 2017/0144309 A1 * | 5/2017 | Sankai | B25J 9/1694 | |
| 2017/0148075 A1 * | 5/2017 | High | G06Q 30/0617 | |
| 2017/0178066 A1 * | 6/2017 | High | G06Q 10/087 | |

OTHER PUBLICATIONS

Mark Prigg, "Google's terrifying two legged giant robot taught how to CLEAN: Researchers reveal Ian the Atlas robot can now vacuum, sweep and even put the trash away," DailyMail.com, Jan. 16, 2016.
Smart End Effectors for Robotic Assembly (Abstract), Assembly Engineering, vol. 30, Issue 8, Aug. 1987.

* cited by examiner

KINEMATIC DESIGN FOR ROBOTIC ARM

BACKGROUND

Robotic devices have been used in industrial settings to automate repetitive manufacturing processes such as automobile assembly and semiconductor manufacturing. However, these industrial robots are often complex and expensive. As the use of robotic devices becomes more common in non-industrial settings such as homes, offices, small businesses, and universities, it becomes increasingly important to design robotic devices that are capable and robust while at the same time affordable enough to use in such settings. The mechanical design of robotic devices may be simplified to minimize the cost of manufacturing the devices and decrease the complexity of the control system required to control the devices.

SUMMARY

An example robotic device includes a base linkage, having a first end and a second end, that may be connected to a support base at the first end. The support base may be a mobile base. A first end effector and a first end of a control arm may be connected to the second end of the base linkage. A second end effector may be attached to a second end of the control arm. The control arm may be an actuated control arm configured to move the first end effector to engage or operate in coordination with the first end effector. The first end effector may be a shovel tool and the second end effector may be a sweeping tool configured to engage with the shovel tool. The second end effector may additionally comprise a gripper. Joints connecting the base linkage, the control arm, the first end effector, and the second end effector may all be configured to move in or parallel to the same plane. The robotic device may be used as a household aid robot.

In one example, a robotic arm is provided that includes a base linkage having a first end and a second end. The robotic arm also includes a first end effector connected to the second end of the base linkage through a first rotational joint. The first rotational joint is configured to allow the first end effector to rotate in a first plane. The robotic arm additionally includes a control arm made up of a first linkage having a first end and a second end and a second linkage having a first end and a second end. The first end of the first linkage is connected to the second end of the base linkage through a second rotational joint. The second rotational joint is configured to allow the first linkage to rotate in or parallel to the first plane. The first end of the second linkage is connected to the second end of the first linkage through a third rotational joint. The third rotational joint is configured to allow the second linkage to rotate in or parallel to the first plane. The robotic arm further includes a second end effector connected to the second end of the second linkage through a fourth rotational joint. The fourth rotational joint is configured to allow the second end effector to rotate in or parallel to the first plane.

In another example, a robotic device is provided that includes a mobile base and a base linkage having a first end and a second end. The robotic device also includes a first end effector connected to the second end of the base linkage through a first rotational joint. The first rotational joint is configured to allow the first end effector to rotate in a first plane. The robotic device also includes a control arm made up of a first linkage having a first end and a second end and a second linkage having a first end and a second end. The first end of the first linkage is connected to the second end of the base linkage through a second rotational joint. The second rotational joint is configured to allow the first linkage to rotate in or parallel to the first plane. The first end of the second linkage is connected to the second end of the first linkage through a third rotational joint. The third rotational joint is configured to allow the second linkage to rotate in or parallel to the first plane. The robotic device further includes a second end effector connected to the second end of the second linkage through a fourth rotational joint. The fourth rotational joint is configured to allow the second end effector to rotate in or parallel to the first plane.

In a further example, a method is provided that includes actuating a first rotational joint to rotate a first end effector of a robotic device to a first orientation. The first end effector is connected to a second end of a base linkage through the first rotational joint. The first rotational joint is configured to rotate the first end effector in a first plane. The method also includes actuating a second rotational joint to rotate a control arm of a robotic device to a second orientation. A first end of a first linkage of the control arm is connected to the second end of the base linkage through the second rotational joint. The second rotational joint is configured to rotate the control arm in or parallel to the first plane. The method additionally includes actuating a third rotational joint to align a second end effector with the first end effector based on the first orientation and the second orientation. The second end effector is attached to a second end of a second linkage of the control arm. A first end of the second linkage is connected to a second end of the first linkage through the third actuated rotational joint. The third actuated rotational joint is configured to rotate the second linkage in or parallel to the first plane. The method further includes actuating a fourth rotational joint to operate the second end effector in coordination with the first end effector. The second end effector is connected to the second end of the second linkage through the fourth rotational joint. The fourth rotational joint is configured to rotate the second end effector in or parallel to the first plane.

In an additional example, a non-transitory computer readable storage medium is provided, having stored thereon instructions that, when executed by a computing device, cause the computing device to perform operations. The operations include actuating a first rotational joint to rotate a first end effector of a robotic device to a first orientation. The first end effector is connected to a second end of a base linkage through the first rotational joint. The first rotational joint is configured to rotate the first end effector in a first plane. The operations also include actuating a second rotational joint to rotate a control arm of a robotic device to a second orientation. A first end of a first linkage of the control arm is connected to the second end of the base linkage through the second rotational joint. The second rotational joint is configured to rotate the control arm in or parallel to the first plane. The operations additionally include actuating a third rotational joint to align a second end effector with the first end effector based on the first orientation and the second orientation. The second end effector is connected to a second end of a second linkage of the control arm. A first end of the second linkage is connected to a second end of the first linkage through the third actuated rotational joint. The third actuated rotational joint is configured to rotate the second linkage in or parallel to the first plane. The operations further include actuating a fourth rotational joint to operate the second end effector in coordination with the first end effector. The second end effector is connected to the second end of the second linkage through the fourth rotational joint. The fourth rotational joint is configured to rotate the second end effector in or parallel to the first plane.

In a yet further example, a robotic device is provided having means for actuating a first rotational joint to rotate a first end effector of a robotic device to a first orientation. The first end effector is connected to a second end of a base linkage through the first rotational joint. The first rotational joint is configured to rotate the first end effector in a first plane. The robotic device also includes means for actuating a second rotational joint to rotate a control arm of a robotic device to a second orientation. A first end of a first linkage of the control arm is connected to the second end of the base linkage through the second rotational joint. The second rotational joint is configured to rotate the control arm in or parallel to the first plane. The robotic device additionally includes means for actuating a third rotational joint to align a second end effector with the first end effector based on the first orientation and the second orientation. The second end effector is attached to a second end of a second linkage of the control arm. A first end of the second linkage is connected to a second end of the first linkage through the third actuated rotational joint. The third actuated rotational joint is configured to rotate the second linkage in or parallel to the first plane. The robotic device further includes means for actuating a fourth rotational joint to operate the second end effector in coordination with the first end effector. The second end effector is connected to the second end of the second linkage through the fourth rotational joint. The fourth rotational joint is configured to rotate the second end effector in or parallel to the first plane.

In one other example, robotic device is provided including a mobile base and a base linkage having a first end and a second end, where the first end of the base linkage is connected to the mobile base. The robotic device also includes a first end effector connected to the second end of the base linkage. The first end effector includes a shovel tool. The robotic device additionally includes an actuated control arm having a first end and a second end. The first end of the actuated control arm is connected to the second end of the base linkage. The robotic device further includes a second end effector connected to the second end of the actuated control arm. The second end effector includes a sweeping tool. The actuated control arm is configured to move the sweeping tool to engage with the shovel tool to sweep one or more objects onto the shovel tool.

In yet another example, a method is provided that includes causing an actuated control arm of a robotic device to move a sweeping tool to push an object onto a shovel tool. The shovel tool and a first end of the actuated control arm are each connected to a second end of a base linkage of the robotic device. The sweeping tool is connected to a second end of the actuated control arm. The method also includes causing the base linkage to raise the actuated control arm and the shovel tool while the object is disposed on the shovel tool by causing an actuated rotational joint to rotate the base linkage with respect to a mobile base of the robotic device. The actuated rotational joint connects a first end of the base linkage to the mobile base. The method additionally includes causing the mobile base to navigate to a drop-off location while the object is disposed on the shovel tool. The method further includes causing the shovel tool to drop off the object at the drop-off location.

In a further example, a non-transitory computer readable storage medium is provided having stored thereon instructions that, when executed by a computing device, may cause the computing device to perform operations. The operations include causing an actuated control arm of a robotic device to move a sweeping tool to push an object onto a shovel tool. The shovel tool and a first end of the actuated control arm are each connected to a second end of a base linkage of the robotic device. The sweeping tool is connected to a second end of the actuated control arm. The operations also include causing the base linkage to raise the actuated control arm and the shovel tool while the object is disposed on the shovel tool by causing an actuated rotational joint to rotate the base linkage with respect to a mobile base of the robotic device. The actuated rotational joint connects a first end of the base linkage to the mobile base. The operations additionally include causing the mobile base to navigate to a drop-off location while the object is disposed on the shovel tool. The operations further include causing the shovel tool to drop off the object at the drop-off location.

In yet a further example, a robotic device includes a means for causing an actuated control arm of a robotic device to move a sweeping tool to push an object onto a shovel tool. The shovel tool and a first end of the actuated control arm are each connected to a second end of a base linkage of the robotic device. The sweeping tool is connected to a second end of the actuated control arm. The robotic device also includes means for causing the base linkage to raise the actuated control arm and the shovel tool while the object is disposed on the shovel tool by causing an actuated rotational joint to rotate the base linkage with respect to a mobile base of the robotic device. The actuated rotational joint connects a first end of the base linkage to the mobile base. The robotic device additionally includes means for causing the mobile base to navigate to a drop-off location while the object is disposed on the shovel tool. The robotic device further includes means for causing the shovel tool to drop off the object at the drop-off location.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
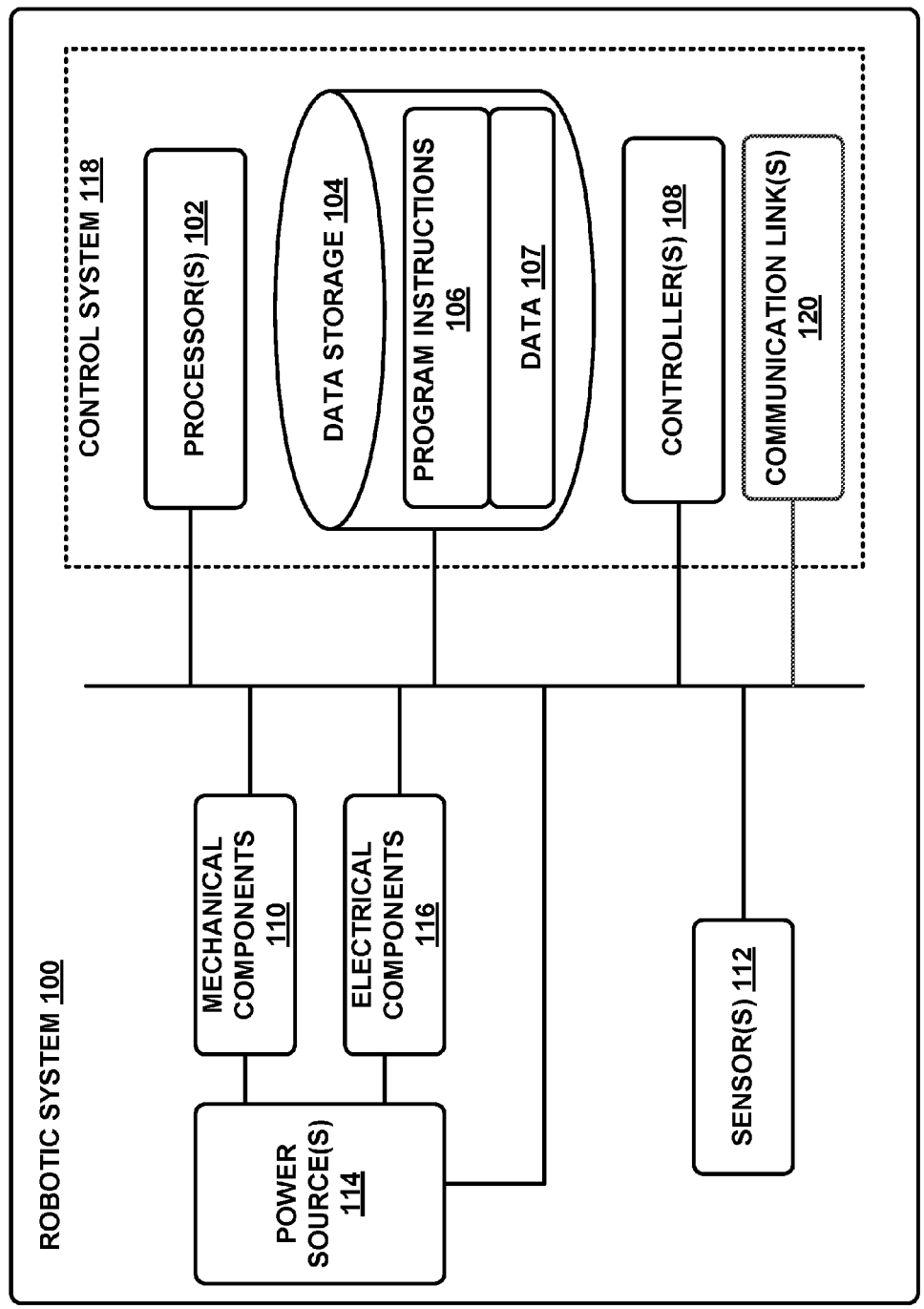
FIG. 1 illustrates a configuration of a robotic system, according to an example embodiment.

Example embodiments are described herein. The words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. Thus, the aspects of the present disclosure, as generally described herein and illustrated in the figures, can be arranged, substituted, combined, separated, and designed in a wide variety of different configurations, all of which are contemplated herein.

In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein. Further, unless otherwise noted, figures are not drawn to scale and are used for illustrative purposes only. Moreover, the figures are representational only and not all components are shown. For example, additional structural or restraining components might not be shown.

I. OVERVIEW

Described herein is an example robotic device along with example operations that may be performed by the example robotic device and/or variations thereof. The example robotic device may include a robotic arm having a limited number of degrees of freedom. The limited number of degrees of freedom may reduce a cost of manufacturing and programming the robotic device, making it affordable for non-industrial applications. The robotic device may additionally include at least two coordinated end effectors connected at different positions on the robotic arm. Different combinations of end effectors may be chosen to adapt the robotic device to perform different types of coordinated tasks, such as picking up and moving objects of varying sizes.

Specifically, the robotic device may comprise a base linkage having a first end and a second end. The first end may be connected to a support base. The support base may be a stationary anchor point about which or with respect to which the base linkage may rotate. Alternatively, the support base may be a mobile support base having wheels, tracks, or legs to allow the robotic device to move about an environment. A first end effector may be connected to the second end of the base linkage through a first actuated rotational joint. The first end effector may be one of a number of available end effectors. For example, the first end effector may be a shovel tool made up of two serially connected portions.

The robotic device may further include a control arm having a first end and a second end. The first end of the control arm may be connected to the second end of the base linkage through a second actuated rotational joint. The control arm may be made up of two serially connected linkages. The linkages may be serially connected through a third actuated rotational joint. A second end effector may be connected to the second end of the control arm through a fourth actuated rotational joint.

The second end effector may be selected from a number of available end effector. In one example, the second end effector may include a sweeping tool. The sweeping tool may be configured to engage with the shovel tool to move/push/sweep objects onto the shovel tool when actuated by the fourth rotational joint or by the control arm. The base linkage may be connected to the support base through an actuated rotational joint configured to rotate the base linkage with respect to the support base. As a result of both the shovel tool and the control arm branching from the base linkage (both being connected directly to the base linkage at the same point), the relative position between the sweeping tool and the shovel tool may remain unchanged as the base linkage moves/rotates with respect to the support base.

In some embodiments, the second end effector may additionally or instead include a gripper. The gripper may be used by the robotic device to grasp and hold other objects that cannot be moved or grasped using the sweeping tool, the shovel tool, or a combination thereof. The gripper may also be used to pick up and move objects by operating in coordination with the shovel tool. Alternatively, the gripper may be used to perform a first task while the sweeping tool is performing a second task. For example, the gripper may be used to remove a lid from a garbage can and the sweeping tool may be used to sweep garbage off the shovel tool into the garbage can.

The base linkage may be connected to the support base through a fifth rotational joint. The fifth rotational joint may be configured to tilt and/or rotate the base linkage, and thus the entire robotic arm, with respect to the support base. The first, second, third, fourth, and fifth joints may all be configured to move in or parallel to the same plane. Consequently, the first and second end effectors as well as the base linkage and control arm may also be configured to move in or parallel to the same plane.

Limiting the movement to the same or parallel planes may allow the robotic device to minimize an amount of computational power required to coordinate motion of the first end effector and the second end effector. Additionally, limiting the first, second, third, fourth, and/or fifth joints to be one degree of freedom rotational joint may reduce the cost of the robotic device in comparison to a robotic device made with joints having more than one degree of freedom. Additionally, limiting the total number of joints on the robotic device may further reduce the cost of the robotic device. A less expensive robotic device may be more accessible and more popular with non-industrial consumers such as retail consumers who may use the robotic device as a household aid robot.

Figure 2A:
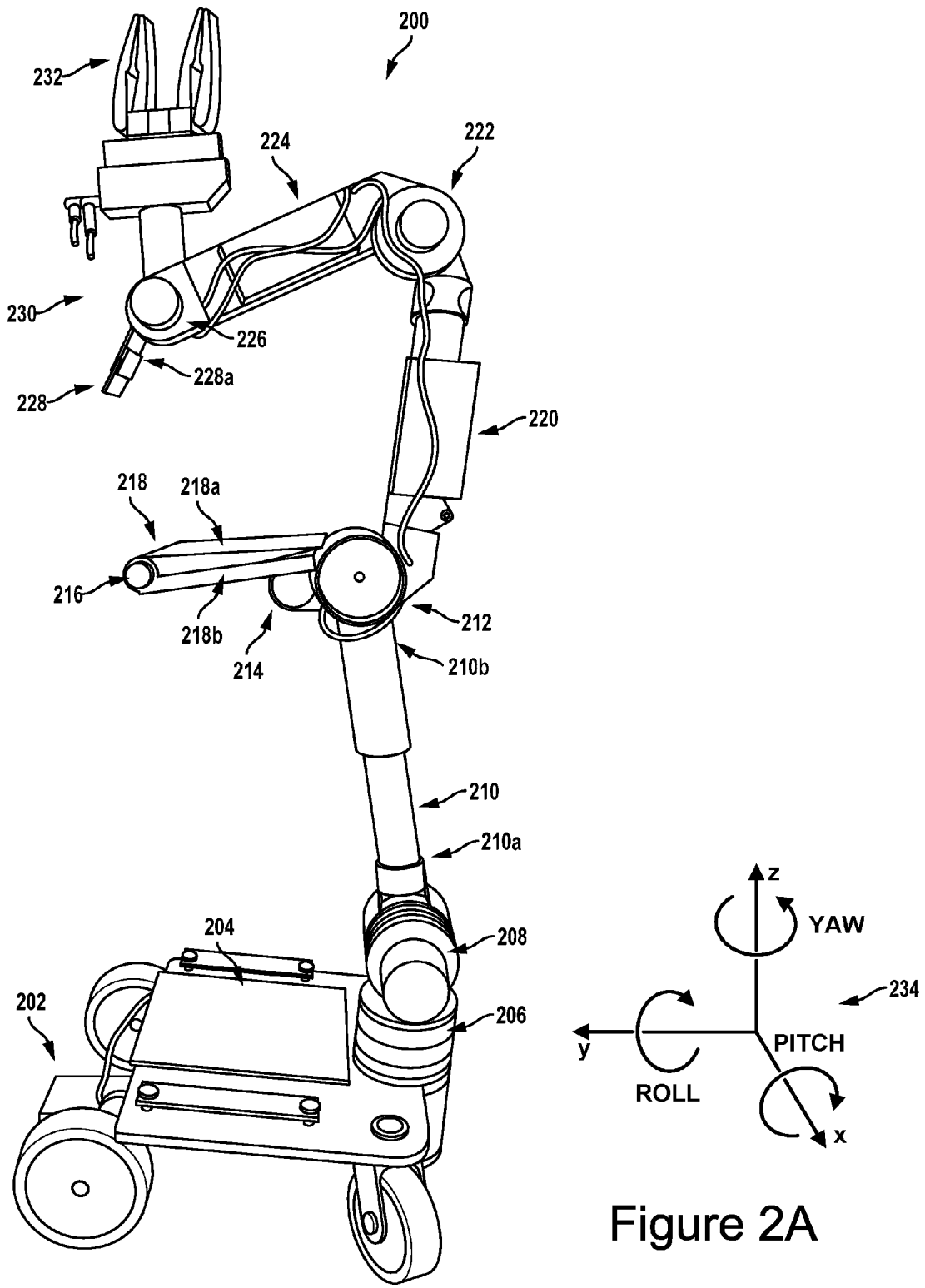
FIG. 2A illustrates an example robotic device in a first conformation, according to an example embodiment.
Figure 2B:
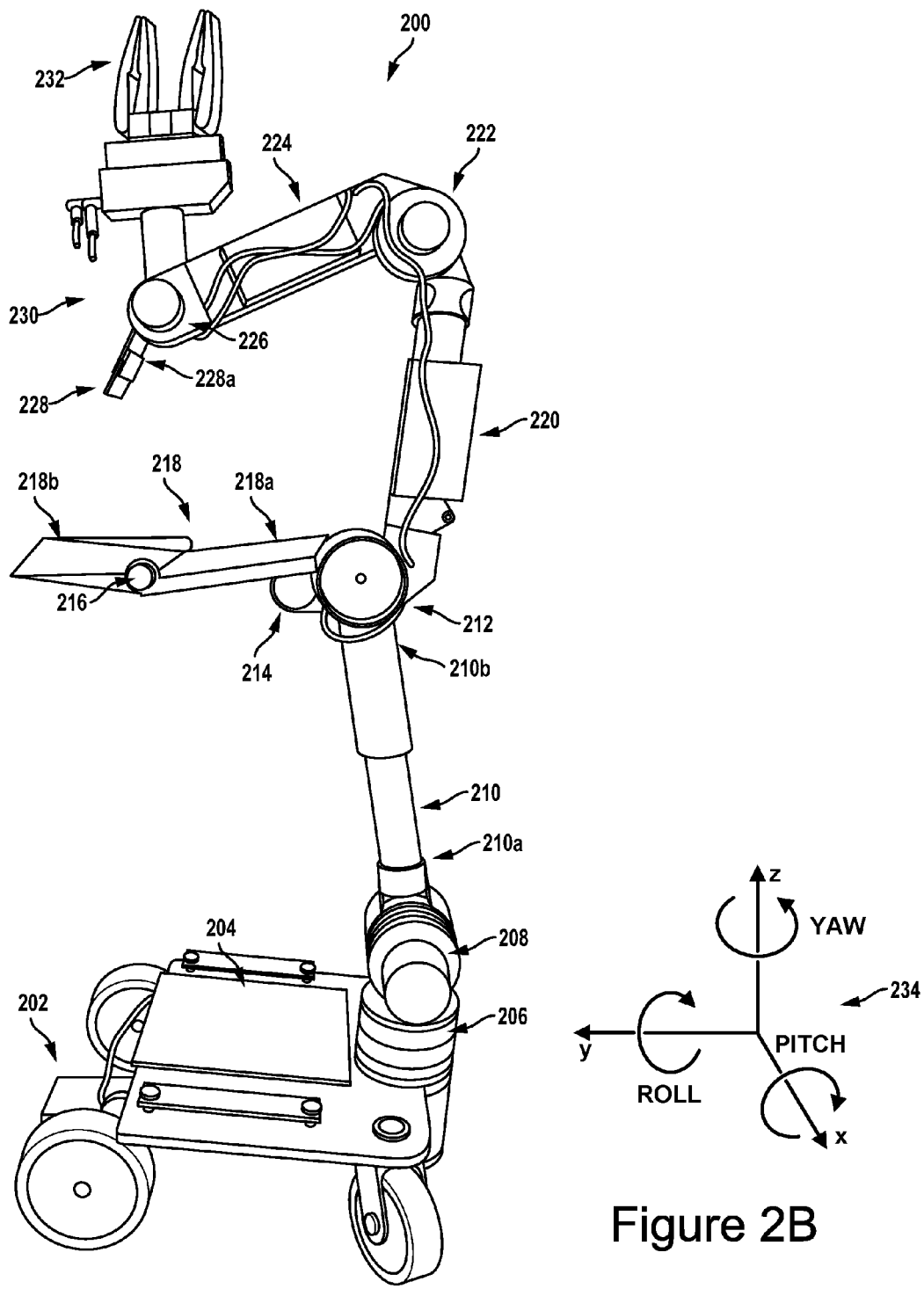
FIG. 2B illustrates an example robotic device in a second conformation, according to an example embodiment.

Additionally, when the first and second end effectors are complementary end effectors (e.g., shovel tool and sweeping tool), limiting the movement of the two end effectors to the same or parallel planes may ensure that the two end effectors are always oriented in a preferred orientation with respect to each other. For example, the sweeping tool may be oriented such that that when actuated, a long edge of the sweeping tool engages a leading edge of the shovel tool. An example of this orientation is illustrated in FIGS. 2A and 2B.

Figure 3:
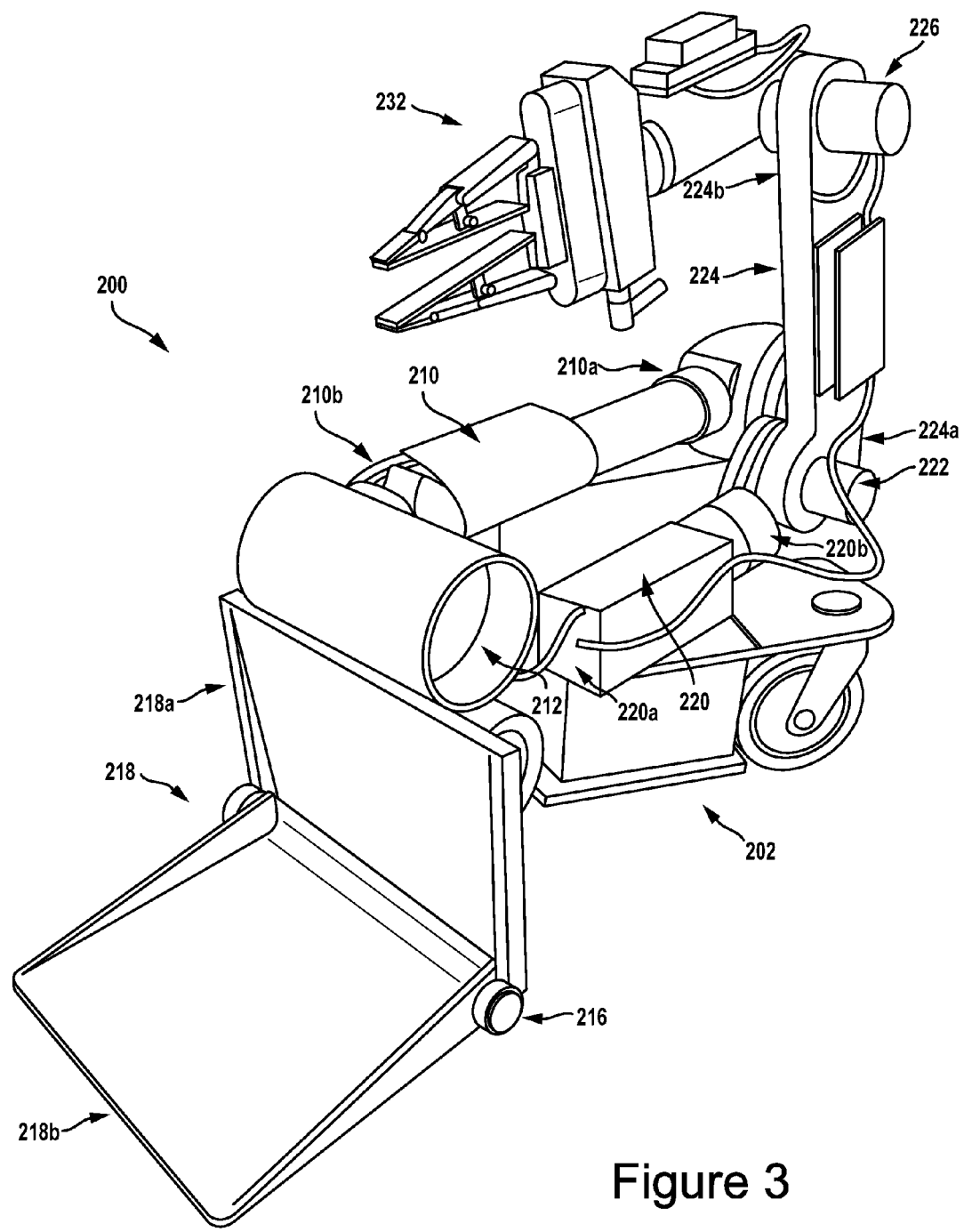
FIG. 3 illustrates an example robotic device in a half-folded conformation, according to an example embodiment.
Figure 4:
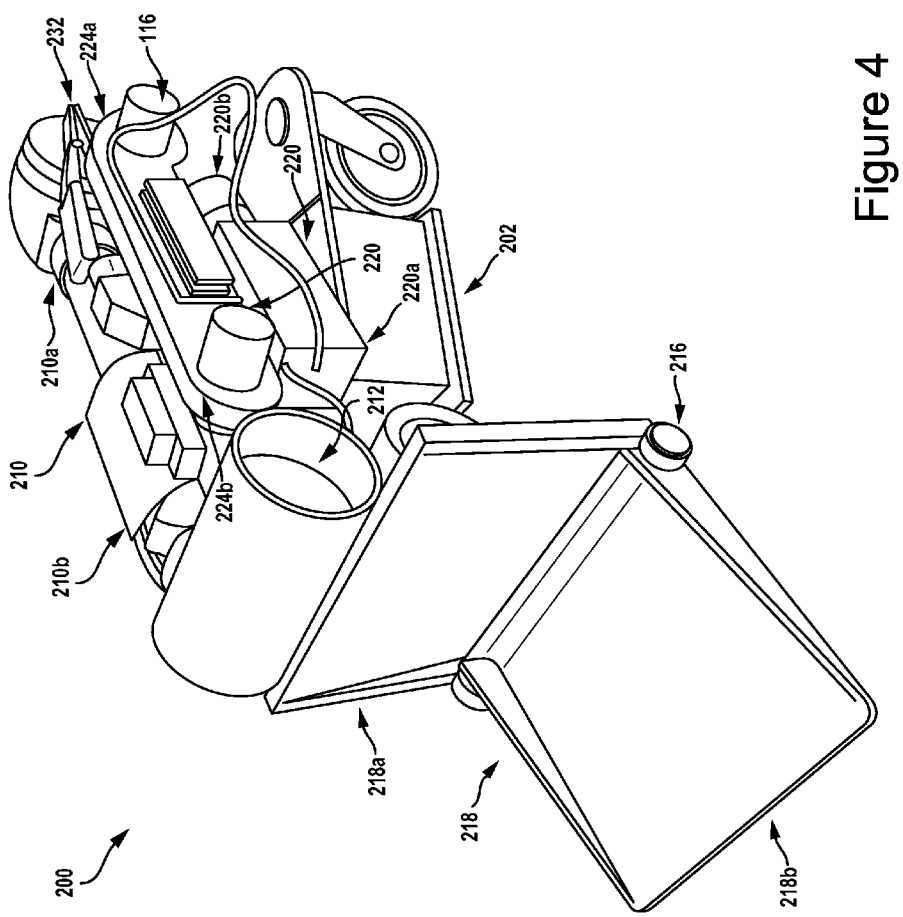
FIG. 4 illustrates an example robotic device in a fully-folded conformation, according to an example embodiment.

In some embodiments, the base linkage and the control arm linkages may be offset from each other so as to allow the robotic device to form into a compact conformation, as illustrated in FIGS. 3 and 4. The robotic device may be folded into the compact (fully-folded) conformation in order to minimize an amount of space ("spatial footprint") occupied by the robotic device when the robotic device is not performing operations and/or is put away for storage. For example, when the robotic device is used as a household aid robot, members of the household may prefer a device that occupies less space when the device is not actively performing useful operations (e.g., the device is charging its batteries or is stowed away for storage). In some embodiments, folding into a compact form, either fully or partially, may allow the robotic device to avoid collisions and/or operate in confined environments.

In general, the robotic device may be used in a plurality of settings and may be configured to perform operations corresponding to each setting. For example, the robotic device may be used as a household aid robot. The robotic device may be configured to collect and load laundry into a hamper or washer, clean the floor by collecting garbage, clean up toys by gathering the toys and loading them into a toy storage bin, move pieces of furniture into their proper positions, and fetch drinks, food, and keys, among other possible tasks. The robotic device may additionally be used as a yard work aid robot to perform certain yard work such as sweeping up and gathering fallen leaves, sticks, and any other undesirable items that may be left in a back or front yard. The robotic device may be configured to perform any of the operations described herein autonomously in order to reduce an amount of human input needed to control the robotic device.

In general, the design of the robotic device and the robotic arm thereof may be generalized to other tasks and operations. For example, the kinematic design of the robotic arm may be adapted to operate in a semiconductor manufacturing process. The first end effector may be a forked end effector commonly used by robotic devices in semiconductor manufacturing processes to handle silicon wafers. The first actuated rotational joint (connecting the first end effector to the base linkage) may be used to place this first end effector in a first orientation. For example, the first orientation may be under or adjacent to the silicon wafer. The second actuated rotational joint (connecting the first control arm linkage to the base linkage) may subsequently be actuated to position the control arm in a second orientation. Positioning the control arm in this second orientation may bring the second end effector into proximity of the first end effector.

The third actuated rotational joint (connecting the second control arm linkage to the first control arm linkage and having the second end effector on the end thereof) may be actuated to position the second end effector to align the second end effector with the first end effector. In some embodiments, the second end effector may be an end effector adapted to accurately repositioning the silicon wafer on the first end effector. In other embodiments, the second end effector may be a gripper (e.g., suction gripper) configured to pick up and move the silicon wafer. In further embodiments, the second end effector may be a photoresist applicator/nozzle or a chemical wash/rinse applicator/nozzle. The fourth actuated rotational joint (connecting the second end effector to the second control arm linkage) may be actuated to operate in coordination with the first end effector.

The branching kinematic structure (first end effector branching from the base linkage, control arm with second end effector connected thereto also branching from the base linkage) and the limited number of degrees of freedom (first end effector and second end effector move only in or parallel to the same plane) may be particularly useful in settings like semiconductor manufacturing that require precise positioning of objects (e.g., silicon wafer) with respect to the manufacturing equipment (e.g., lithographic mask). Since the first and second end effectors both branch from a single linkage (the base linkage) and both end effectors may be mechanically limited to always work in or parallel to the same plane, error in positioning of the end effectors with respect to each other may be eliminated or reduced. When two end effectors are not connected together as described herein and are instead mounted to two different robotic arms, error may be present in horizontal, lateral, and vertical positioning of the two end effectors with respect to each other. In the robotic arm described herein, lateral positioning error is reduced or eliminated by mechanically confining the end effectors to always move in or parallel to the same plane.

Accordingly, the robotic arm may be manufactured with low tolerances (manufacture precisely) to ensure that less than a threshold extent of error is present in the relative lateral positioning of the first end effector and the second end effector, thereby improving the precision of operation of the robotic arm. Minimizing an extent of lateral positioning error may ensure that the first end effector consistently engages the second end effector in the same position and/or in the same manner (e.g., with the same amount of force).

In some embodiments, the first and second end effectors may be modular. Namely, different end effectors may be installed on the robotic arm of the robotic device depending on the task the robotic device is expected to perform. The end effectors may be changed while the robotic device is performing a process to allow a single robotic device to perform different steps of the process, as opposed to having multiple robotic devices perform the different steps of the process. For example, in a semiconductor manufacturing process, the first end effector may first be a spin plate configured to spin photoresist onto a silicon wafer. The spin plate may subsequently be exchanged for a hot plate to use in the process of baking the silicon wafer. This arrangement of interchangeable end effectors may be useful in small-scale semiconductor manufacturing settings that want the benefit of an automated manufacturing process without the cost of a full robotic processing line.

Other combinations of end effectors may be possible. The kinematic structure of the robotic arm may be outfitted with different pairs of end effectors to operate in a number of different environments. For example, when the first end effector is a shovel tool and the second end effector is a sweeping tool, the robotic device may be adapted to sweep up small objects from around the house, the backyard, and/or the sidewalk. When the first end effector is a bucket and the second end effector is a mop, the robotic device may be adapted to mop the floor of a house. The robotic device may also be used as a digger/excavator. For example, the first end effector may be an excavator shovel tool and the second end effector may be an excavator bucket tool. The robotic device may move the excavator bucket tool in a sweeping motion to push dirt into the excavator shovel tool. Other combinations of complementary end effectors may be possible.

II. EXAMPLE ROBOTIC SYSTEMS

FIG. 1 illustrates an example configuration of a robotic system that may be used in connection with the embodiments described herein. The robotic system 100 may be configured to operate autonomously, semi-autonomously, and/or using directions provided by user(s). The robotic system 100 may be implemented in various forms, such as a walking robot (e.g., biped, quadruped, hexapod, octoped), a wheeled robot, a stair climbing robot, a robot on tracks, or some other arrangement. Furthermore, the robotic system 100 may also be referred to as a robot, robotic device, or mobile robot, among other designations.

As shown in FIG. 1, the robotic system 100 may include processor(s) 102, data storage 104, and controller(s) 108, which together may be part of a control system 118. The robotic system 100 may also include sensor(s) 112, power source(s) 114, mechanical components 110, electrical components 116, and communication link(s) 120. Nonetheless, the robotic system 100 is shown for illustrative purposes, and may include more or fewer components. The various components of robotic system 100 may be connected in any manner, including wired or wireless connections. Further, in some examples, components of the robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the robotic system 100, such as sensor(s) 112, power source(s) 114, mechanical components 110, electrical components 116, and/or communication link(s) 120.

The data storage 104 may be one or more types of hardware memory. For example, the data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some embodiments, the data storage 104 can be a single physical device. In other embodiments, the data storage 104 can be implemented using two or more physical devices, which may communicate with one another via wired or wireless communication. As noted previously, the data storage 104 may include the computer-readable program instructions 106 and the data 107. The data 107 may be any type of data, such as configuration data, sensor data, and/or diagnostic data, among other possibilities.

The controller 108 may include one or more electrical circuits, units of digital logic, computer chips, and/or microprocessors that are configured to (perhaps among other tasks) interface between any combination of the mechanical components 110, the sensor(s) 112, the power source(s) 114, the electrical components 116, the control system 118, the communication link(s) 120, and/or a user of the robotic system 100. In some embodiments, the controller 108 may be a purpose-built embedded device for performing specific operations with one or more subsystems of the robotic device 100.

The control system 118 may monitor and physically change the operating conditions of the robotic system 100. In doing so, the control system 118 may serve as a link between portions of the robotic system 100, such as between mechanical components 110 and/or electrical components 116. In some instances, the control system 118 may serve as an interface between the robotic system 100 and another computing device. Further, the control system 118 may serve as an interface between the robotic system 100 and a user. For instance, the control system 118 may include various components for communicating with the robotic system 100, including a joystick, buttons, and/or ports, etc. The example interfaces and communications noted above may be implemented via a wired or wireless connection, or both. The control system 118 may perform other operations for the robotic system 100 as well.

In some implementations, the control system 118 of robotic system 100 may also include communication link(s) 120 configured to send and/or receive information. The communication link(s) 120 may transmit data indicating the state of the various components of the robotic system 100. For example, information read by sensor(s) 112 may be transmitted via the communication link(s) 120 to a separate device. Other diagnostic information indicating the integrity or health of the power source(s) 114, mechanical components 110, electrical components 116, processor(s) 102, data storage 104, and/or controller 108 may be transmitted via the communication link(s) 120 to an external communication device.

In some implementations, the robotic system 100 may receive information at the communication link(s) 120 that is then processed by the processor(s) 102. The received information may indicate data that is accessible by the processor(s) 102 during execution of the program instructions 106. Further, the received information may change aspects of the controller(s) 108 that may affect the behavior of the mechanical components 114 or the electrical components 116. In some cases, the received information may indicate a query requesting a particular piece of information (e.g. the operational state of one or more of the components of the robotic system 100). The processor(s) 102 may subsequently transmit the particular piece of information back out the communication link(s) 120.

In some cases, the communication link(s) 120 may include a wired connection. The robotic system 100 may include one or more ports to interface the communication link(s) 120 to an external device. The communication link(s) 120 may include, in addition to or alternatively to the wired connection, a wireless connection. Some example wireless connections may utilize a cellular connection, such as CDMA, EVDO, GSM/GPRS, or 4G telecommunication, such as WiMAX or LTE. Alternatively or in addition, the wireless connection may utilize a Wi-Fi connection to transmit data to a wireless local area network (WLAN). In some implementations, the wireless connection may also communicate over an infrared link, Bluetooth, or a near-field communication (NFC) device.

During operation, the control system 118 may communicate with other systems of the robotic system 100 via wired or wireless connections, and may further be configured to communicate with one or more users of the robot. As one possible illustration, the control system 118 may receive an input (e.g., from a user or from another robot) indicating an instruction to perform a particular set of household tasks such as cleaning up the floor. The input to control system 118 may be received via the communication link(s) 120.

Based on this input, the control system 118 may perform operations to cause the robotic device 100 to use sensors 112 to analyze the floor of the house and subsequently use mechanical components 110 to gather and remove any dirt, clothes, toys, and/or other obstacles from the floor. As another illustration, a control system may receive an input indicating an instruction to gather dirty clothes, towels, and/or bedding and place them in the washer. In response, the control system 118 (perhaps with the assistance of other components or systems) may search the house for clothes, towels, bedding, and/or other housewares that appear to require washing. The control system 118 may determine a speed and/or gait for the robotic system 100 based on the environment/layout of the house and may also alter or adjust the route or path or portions thereof as the robotic system 100 scans and analyzes the contents of each room of the house.

Operations of the control system 118 may be carried out by the processor(s) 102. Alternatively, these operations may be carried out by the controller 108, or a combination of the processor(s) 102 and the controller 108. In some embodiments, the control system 118 may partially or wholly reside on a device other than the robotic system 100, and therefore may at least in part control the robotic system 100 remotely. Communication link(s) 120 may be used at least in part to carry out the remote communication.

Mechanical components 110 represent hardware of the robotic system 100 that may enable the robotic system 100 to perform physical operations. As a few examples, the robotic system 100 may include physical members such as leg(s), arm(s), wheel(s), linkage(s), track(s), and/or end effector(s). The physical members or other parts of robotic system 100 may further include motors and actuators arranged to move the physical members in relation to one another. The robotic system 100 may also include one or more structured bodies for housing the control system 118 and/or other components, and may further include other types of mechanical components. The particular mechanical components 110 used in a given robot may vary based on the design of the robot, and may also be based on the operations and/or tasks the robot may be configured to perform.

In some examples, the mechanical components 110 may include one or more removable components. The robotic system 100 may be configured to add and/or remove such removable components, which may involve assistance from a user and/or another robot. For example, the robotic system 100 may be configured with removable arm(s), hand(s), fee(t), leg(s), linkage(s), wheel(s), track(s), and/or end effector(s) so that these members can be replaced or changed as needed or desired. In some embodiments, the robotic system 100 may include one or more removable and/or replaceable battery units or sensors. Other types of removable components may be included within some embodiments.

The robotic system 100 may include sensor(s) 112 arranged to sense aspects of the robotic system 100. The sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras, among other possibilities. Within some examples, the robotic system 100 may be configured to receive sensor data from sensors that are physically separated from the robot (e.g., sensors that are positioned on other robots or located within the environment in which the robot is operating).

The sensor(s) 112 may provide sensor data to the processor(s) 102 (perhaps by way of data 107) to allow for interaction of the robotic system 100 with its environment, as well as monitoring of the operation of the robotic system 100. The sensor data may be used in evaluation of various factors for activation, movement, and deactivation of mechanical components 110 and electrical components 116 by control system 118. For example, the sensor(s) 112 may capture data corresponding to the terrain of the environment, the layout of the environment (e.g., the floor plan of the house, apartment, condominium, business residence, etc.), the surface geometry of the environment (e.g., stairs, inclines, etc.), location of nearby objects, and/or identity of nearby objects, which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for 3D vision), a global positioning system (GPS) transceiver, and/or other sensors for capturing information of the environment in which the robotic system 100 is operating. The sensor(s) 112 may monitor the environment in real time, and detect obstacles, elements of the terrain, weather conditions, temperature, and/or other aspects of the environment.

Further, the robotic system 100 may include sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such the operation of extendable legs, arms, wheels, linkages, actuators, and/or other mechanical and/or electrical features of the robotic system 100. The data provided by the sensor(s) 112 may enable the control system 118 to determine errors in operation as well as monitor overall operation of components of the robotic system 100.

As an example, the robotic system 100 may use force sensors to measure load on various components of the robotic system 100. In some implementations, the robotic system 100 may include one or more force sensors on one or more robotic members such as a arms, legs, wheels, linkages, and/or end effectors to measure the load on the actuators that move the one or more members. As another example, the robotic system 100 may use one or more position sensors to sense the position of the actuators of the robotic system. For instance, such position sensors may sense states of extension, retraction, and/or rotation of the actuators on arms or legs.

As another example, the sensor(s) 112 may include one or more velocity and/or acceleration sensors. The sensor(s) 112 may measure both linear and angular velocity and/or acceleration. For instance, the sensor(s) 112 may include an inertial measurement unit (IMU) having a 3-axis accelerometer, a 3-axis gyroscope, and a 3-axis magnetometer. The IMU may sense velocity and acceleration in the world frame, with respect to the gravity vector. The velocity and acceleration sensed by the IMU may then be translated to that of the robotic system 100 based on the location of the IMU in the robotic system 100 and the kinematics of the robotic system 100.

The robotic system 100 may include other types of sensors not explicated discussed herein. Additionally or alternatively, the robotic system may use particular sensors for purposes not enumerated herein.

The robotic system 100 may also include one or more power source(s) 114 configured to supply power to various components of the robotic system 100. Among other possible power systems, the robotic system 100 may include a hydraulic system, electrical system, batteries, and/or other types of power systems. As an example illustration, the robotic system 100 may include one or more batteries configured to provide charge to components of the robotic system 100. Some of the mechanical components 110 and/or electrical components 116 may each connect to a different power source, may be powered by the same power source, or be powered by multiple power sources.

Any type of power source may be used to power the robotic system 100, such as electrical power or a gasoline engine. Additionally or alternatively, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of the robotic system 100. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various operations. The electrical components 116 may be configured to provide power from the power source(s) 114 to the various mechanical components 110, for example. Further, the robotic system 100 may include electric motors. Other examples of electrical components 116 may exist as well.

Although not shown in FIG. 1, the robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body and/or the other components may be developed using various types of materials, such as metals or plastics. Within other examples, a robot may have a body with a different structure or made of various types of materials.

The body and/or the other components may include or carry the sensor(s) 112. These sensors may be positioned in various locations on the robotic device 100, such as on the body and/or on one or more of the appendages, among other examples.

On its body, the robotic device 100 may carry a load, such as a type of cargo that is to be transported. The load may also represent external batteries or other types of power sources (e.g., solar panels) that the robotic device 100 may utilize. Carrying the load represents one example use for which the robotic device 100 may be configured, but the robotic device 100 may be configured to perform other operations as well.

As noted above, the robotic system 100 may include various types of legs, arms, wheels, tracks, treads, linkages, and so on. In general, the robotic system 100 may be configured with zero or more legs. An implementation of the robotic system with zero legs may include wheels, tracks, treads, or some other form of locomotion. An implementation of the robotic system with two legs may be referred to as a biped or bipedal robot, and an implementation with four legs may be referred as a quadruped or quadrupedal robot. Implementations with six or eight legs are also possible.

III. EXAMPLE MECHANICAL DESIGNS OF A ROBOTIC DEVICE

An example robotic device capable of locating, manipulating, moving, and/or otherwise operating on objects is described herein. The robotic device may be used, for example, as a household help robot to carry out various tasks around a person's home (e.g., house, apartment, condominium, or any other type of residence). In some example embodiments, the robotic device may be programmed to clean the floors of the house, collect and load dirty laundry into a clothes hamper or washing machine, throw away garbage scattered around the home, organize/return various household items to their respective storage places, and/or fetch various items (e.g., glass of water, keys) for a member of the household. In comparison to complex industrial robots, the example robotic device described herein may be constructed with a reduced number of degrees of freedom in order to reduce the cost of manufacturing and programming the robotic device.

FIGS. 2A and 2B illustrate an example robotic device 200. Robotic device 200 may be used to carry out the operations described herein. A robotic arm of robotic device 200 may be mounted on or connected to a base 202. The base 202 may be a mobile base configured to move about an environment using different means of movement including, for example, wheels, tracks, legs, and/or any combinations or variations thereof. The base 202 may have located thereon a control system 204 of the robotic device 200. The control system 204 may be the example control system 118 shown and described with respect to FIG. 1. The mobile base may also have located thereon a subset of the sensors 112, electrical components 116, and/or power sources 114, as shown and described with respect to FIG. 1.

The robotic arm may include a base linkage 210. A first end 210a of base linkage 210 may be connected to the mobile base 202 through joints 206 and 208. Within examples, the base linkage may be a mechanical interconnection including at least one mechanical rod, bar, or shaft. In some embodiments, the mechanical rod may be a single, straight (linear) rod. Alternatively, the mechanical rod may have geometric features (e.g., bends, twists) therein. In other embodiments, the base linkage may be a multi-bar/rod linkage (e.g., four-bar linkage) configured to move the first end effector and the control arm with respect to the support base in at least one direction (with at least one degree of freedom).

Joint 206 may be an actuated rotational joint configured to rotate/swivel the base linkage 210 horizontally, from side to side (yaw rotation about the z-axis of coordinate system 234) with respect to the base 202. In some embodiments, joint 206 may be a purely rotational joint allowing the base linkage 210 to move only in or parallel to a plane of rotation of the joint 206 (base linkage 210 may be restricted to yaw rotation about actuated rotational joint 206).

Joint 208 may be an actuated rotational joint configured to rotate/tilt base linkage 210 vertically, up and down (pitch rotation about the x-axis of coordinate system 234) with respect to the base 202. In some embodiments, joint 208 may be a purely rotational joint allowing the base linkage 210 to move only in or parallel to a plane of rotation of the joint 208 (base linkage 210 may be restricted to pitch rotation about actuated rotational joint 208).

The principal rotations of yaw, pitch, and roll (also known as Tait-Bryan angles) as used herein are illustrated by example coordinate system/reference frame 234, shown in FIGS. 2A and 2B. The coordinate system 234 may be attached to the robotic device or a portion thereof such as, for example, the base 202 of the robotic device. Thus, the principle rotations may be defined with respect to the robotic device (in a robot-centered reference frame), as opposed to being defined with respect to a reference frame external to the robot (e.g., a reference frame fixed at a point on the Earth).

A first end effector 218 may be attached to a second end 210b of the base linkage 210. The first end effector 218 may be a shovel tool comprising a first portion 218a connected to the second end 210b of base linkage 210 and a second portion 218b serially connected to the first portion 218a. Within examples, a shovel tool may be an implement including a broad blade, a scoop, a pan, and/or a tray that may be used for digging, lifting, carrying, and/or moving materials/objects. The shovel tool may be rounded, flat, or have different geometric features included therein. The specific design of the shovel tool may vary between embodiments. The specific design (e.g., shape of the shovel tool and geometric features thereof) may be based on an intended use of the shovel tool in a particular embodiment.

In the shovel tool 218 pictured in FIGS. 2A and 2B, the first portion 218a may be rigidly connected (in a fixed orientation) to the second end 210b of the base linkage 210. A pitch of the shovel tool 218 may be controlled by controlling the pitch of the base linkage 210 using actuated rotational joint 208. The second portion 218b of the shovel tool 218 may be rotatably connected to the first shovel tool portion 218a through rotational joint 216. Rotational joint 216 may be an actuated rotational joint configured to move the second shovel tool portion 218b with respect to the first shovel tool portion 218a. Joint 216 may be actuated by actuator/motor 214. Motor 214 may be coupled to the rotational joint 216 through a drive belt (not shown). The shovel tool 218 may be movable, about joint 216, between a closed conformation, illustrated in FIG. 2A, and an open conformation, illustrated in FIG. 2B, as well as other conformations therebetween.

The robotic arm may further include a control arm comprising first linkage 220 and second linkage 224, connected to the second end 210b of the base linkage 210. A first end of the first linkage 220 may be connected to the second end 210b of the base linkage 210 through rotational joint 212. A first end of the second linkage 224 may be connected to a second end of the first linkage 220 through rotational joint 222. Rotational joint 212 may be actuated to control a pitch of the first linkage 220 as well as the pitch of the control arm (first linkage 220 and second linkage 224) as a whole. Rotational joint 222 may be actuated to control a pitch of the second linkage 224. The rotational joints 212 and 222 may be purely rotational joints configured to rotate the first linkage 220 and the second linkage 224, respectively, in or parallel to a single plane of rotation. The control arm may also be referred to as an actuated control arm when it is actuated and/or configured to be actuated by at least one joint.

The robotic arm may additionally include a second end effector 230. Second end effector 230 may be connected to the second end of the second control arm linkage 224 through joint 226. Joint 226 may be an actuated rotational joint configured to rotate/actuate the second end effector 230 in a plane parallel to or coincident with the plane of rotation of joints 212 and 222. The second end effector 230 may be controlled directly by rotation of joint 226 or indirectly by movements of the control arm (first control arm linkage 220 and second control arm linkage 224) and/or movements of base linkage 210.

FIG. 2 illustrates second end effector 230 comprising a sweeping tool 228 and a gripper 232. Within examples, a sweeping tool may be an implement including at least one flexible member that may be used for sweeping, moving, pushing, or otherwise actuating materials and/or objects. In some embodiments, the sweeping tool may be a brush-like or broom-like implement including a plurality of flexible members (e.g., bristles) bound together and configured to be used to sweep, move, push, or otherwise actuate a material or object to move the material or object onto the shovel tool. The sweeping tool 228 may be mounted to the actuated rotational joint 226 at a first point on the joint 226. The gripper tool 232 may be mounted to the actuated rotational joint 226 at a second point on the joint 226. The sweeping tool 228 and/or the gripper 232 may be configured to engage with the shovel tool 218.

The sweeping tool 228 may comprise a plurality of compliant finger-like elements (e.g., bristles) arranged in at least one row and oriented parallel to a leading edge of the shovel tool 218 (e.g., the leftmost edge of the second shovel tool portion 218b, as shown in FIG. 2B). The bristles of the sweeping tool 228 may be configured to brush over the leading edge of the shovel tool 218 when the sweeping tool 228 is moved by the control arm and/or joint 226. In other example embodiments, the sweeping tool 228 may comprise a squeegee rubber oriented parallel to the leading edge of the shovel tool 218. The bristles may be held in place by (the bristles may projected from) a rigid (e.g., metallic) frame 228a. The rigid frame may serve to attach the bristles to the rotational joint 226.

The gripper 232 may be a conventional pinch gripper having one set of opposing digits. In addition to being configured to rotate about joint 226 (pitch rotation), the gripper 232 may be configured to rotate in at least one additional degree of freedom (e.g., roll rotation). In an example embodiment, when the gripper 232 is additionally configured for roll rotation, the gripper 232 can be rotated about the roll axis to adapt the gripper 232 to handle objects with of various shapes and/or having different geometric features. For example, in one orientation, the gripper 232 can be used to grasp a glass of water by the sides, by pinching the glass between the at least two fingers of the gripper 232. The gripper 232 can subsequently be caused to rotate by 90 degrees and used to grasp a stack of papers by placing one finger underneath the stack and pushing on a top surface of the stack with the second finger. The number of degrees of freedom of the gripper 232 and/or similar end effectors may be based on a desired cost of the robotic device 200 and/or a desired set of functions that the robotic device 200 is expected to perform.

In other embodiments, the second end effector 230 may comprise more than two different end effectors, each useful for a particular task that the robotic device is expected to perform. Each of the different end effectors may be rotated in and out of an operational position using the actuated rotational joint 226.

A. Example Support Bases

As illustrated in FIGS. 2A and 2B, the base 202 may be a mobile base configured to move about an environment. The mobile base 202 may be configured to move using at least one of a plurality of different means of movement including, for example, wheels (as shown in FIGS. 2A and 2B), tracks, legs, and/or any combinations or variations thereof. The means of movement of mobile base 202 may be chosen based on an expected operating environment of robotic device 200. For example, when working inside a house with level floors and no large obstacles, robotic device 200 may utilize a wheeled base to move about. When the robot works outside, for example, to remove sticks, stones, or other debris from a front yard and/or a back yard of a house, the robot may utilize tracks or legs (e.g., a quadrupedal, hexapedal, or octopedal base). In some implementations, the mobile base 202 may be outfitted with a specialized mechanism and/or arrangement of legs that allows the robotic device 200 to climb up and down stairs.

The mobile base 202 may be modularized to allow the means of movement of the mobile base 202 to be adapted to the terrain the robot encounters or the environment the robot is expected to work in. In some example implementations, the mobile base 202 may be designed to swap between wheels, tracks, legs, and/or other specialized locomotive mechanisms. The process of swapping the means of movement of a mobile base may be carried out by a docking station configured to detach a first (presently attached) means of movement (e.g., wheels) and attach a second means of movement (e.g., caterpillar tracks). In other example implementations, the robotic device 200 may be designed to swap between different mobile bases having different means of movement. The process of swapping between different mobile bases having different means of movement may be accomplished by a docking station configured to detach the robotic device 200 from a first base having a first means of movement (e.g., wheels) and attach a second mobile base having a second means of movement (e.g., caterpillar tracks).

In example embodiments, the support base 202 may be another robotic device such as bipedal or quadrupedal robotic device. For example, the robotic device 200 may be attached on top of a quadrupedal robot designed to carry loads. The robotic device 200 may be utilized to load and unload objects onto the quadrupedal robot. In other example embodiments, the base 202 may be a fixed/stationary anchor/attachment point. Robotic device 200 may be confined to operate in a particular radius of the fixed anchor point. For example, robotic device 200 may operate in a shipping warehouse to pick up, move, and/or sort packages.

In some embodiments, the support base 202 may carry thereon additional end effectors including alternative versions of gripper 232, sweeping tool 228, and shovel tool 218. The additional end effectors may further include different gripper attachments such as alternative versions of the gripping fingers of gripper 232. Support base 202 may further house thereon a docking station configured to allow robotic device to swap between different end effectors.

B. Example Linkages and End Effectors

In some embodiments, the base linkage 210, as shown in FIGS. 2A and 2B, may be a telescopic linkage configured to increase a length of the base linkage 210 by extending the telescopic linkage. The telescopic linkage may be actuated hydraulically, pneumatically, or by a motor. The telescopic linkage may increase the reach of the robotic device 200, allowing the robotic device 200 to, for example, reach objects located in higher places than would normally be possible without a telescopic linkage.

In general, base linkage may be a mechanical interconnection including at least one mechanical rod, bar, or shaft configured to move the control arm and the first end effector with respect to the support base. In some embodiments, the base linkage may be a straight rod/shaft 210, as illustrated in FIGS. 2A and 2B. In other embodiments, the base linkage may be a four-bar linkage including four pivotably connected joints. The four-bar linkage may be driven by at least one actuator (e.g., motor) to rotate with respect to the support base. The rotation with respect to the support base may be a pitch rotation, as illustrated in FIGS. 2A and 2B. In some embodiments, joints 206 and 208 may be located along different points of the base linkage 210 without affecting the overall functionality of the robotic device described herein. Similarly, base linkage 210 may include additional actuated rotational joints. For example, an additional rotational joint configured to produce a pitch rotation may be included in the middle of base linkage 210. Other designs may be possible.

A first end effector 218 may be attached to a second end 210b of the base linkage 210. In general, the first end effector 218 may be at least one of a plurality of available end effectors including pinch grippers, suction grippers, forks/pitchforks, fork/pitchfork-like end effectors, shovels, shovel-like end effectors, excavator buckets, sweeping tools, pans, and specialized end effectors such as a centrifugal spin plate used in spin-coating a thin film onto a semiconductor substrate. The first end effector 218 may be modular, allowing different types of end effectors to be attached depending on the particular task performed by the robotic device 200.

In an example embodiment, the first end effector 218 may be a shovel tool comprising a first portion 218a connected to the second end 210b of base linkage 210 and a second portion 218b serially connected to the first portion 218a. In some embodiments, the first portion 218a may be rigidly connected (in a fixed orientation) to the second end 210b of the base linkage 210. Thus, a pitch of the shovel tool 218 may be controlled by controlling the pitch of the base linkage 210 using actuated rotational joint 208.

In other embodiments, the first portion 218a may be connected to the second end 210b of the base linkage 210 through an actuated rotational joint (not shown) coaxial with joint 212. Thus, the orientation of the first portion 218a of the shovel tool 218 may be adjustable in relation to the base linkage 210. For example, the joint connecting the first portion 218a of the shovel tool 218 to the base linkage 210 may be actuated in order to control a pitch of the first shovel tool portion 218a and therefore also control the pitch of the entire shovel tool 218. Alternatively or additionally, the pitch of the shovel tool 218 may be controlled by controlling the pitch of the base linkage 210 using actuated rotational joint 208. Consequently, the pitch of the shovel tool can be controlled in multiple ways when the first shovel tool portion 218a is rotatably connected to the second end 210b of base linkage 210.

As previously discussed, the second portion 218b of the shovel tool 218 may be rotatably connected to the first shovel tool portion 218a through rotational joint 216. Rotational joint 216 may be an actuated rotational joint configured to move the second shovel tool portion 218b with respect to the first shovel tool portion 218a. The actuated joint 216 may be a purely rotational joint configured to rotate the second shovel tool portion in or parallel to the plane of rotation of the actuated joint 216. The plane of rotation of the joint 216 may be parallel to the plane of rotation of the rotational joint connecting the first shovel tool portion 218a to the base linkage 210. Alternatively, the two planes of rotation may be coincident (same plane of rotation).

The actuated joint 216 may be used to control a pitch of the second shovel tool portion 218b. Additionally, since the second shovel tool portion 218b is attached to the first shovel tool portion 218a, the pitch of the second shovel tool portion 218b may also be controlled by controlling the pitch of the first shovel tool portion 218a, the pitch of the base linkage 210, or a combination thereof. Alternatively, the second portion 218b of the shovel tool 218 may be rigidly connected (in a fixed orientation) to the first shovel tool portion 218a.

Thus, a pitch of the second shovel tool portion 218b might only be controllable by controlling the pitch of the first shovel tool portion 218a, the pitch of the base linkage 210, or a combination thereof.

A leading edge of the shovel tool 218 (e.g., a leading edge of the second shovel tool portion 218b) may include a compliant lip (e.g., rubber lip). The compliant lip of the shovel tool may allow the robotic device to operate on delicate surfaces (e.g., scoop/shovel small toys or other small objects off delicate furniture and/or easily scratched flooring) without risk of damaging the surfaces. The compliant material additionally reduces the need for precise control of the shovel tool 218 when scooping/loading objects onto shovel tool 218. The compliant material may conform to changes in a height of a surface from which the shovel tool 218 is picking/scooping up objects. Thus, small errors in positioning of the shovel tool 218 may be accounted for by the compliance of the compliant lip of shovel tool 218. The compliant lip of shovel tool 218 may further allow for smooth interactions between the shovel tool 218 and the sweeping tool 228 (e.g., the compliant lip may conform to the sweeping tool and "absorb" any error in the relative positioning of the shovel tool 218 and the sweeping tool 228 during operation). The compliant material may be, for example, rubber, plastic, or another type of flexible polymeric material.

In other embodiments, the leading edge of the shovel tool 218 may include one or more rollers to allow the shovel tool 218 to roll/glide over surfaces as opposed to scraping and/or dragging along the surfaces. The rollers may be spherical, cylindrical, conical, or a combination thereof. The rollers may facilitate the process of loading objects onto shovel tool 218 by allowing the objects to roll over the rollers and onto the shovel tool 218. Accordingly, the rollers may reduce an amount of force required to push objects onto the shovel tool 218. Specifically, the rollers may reduce an amount of friction that has to be overcome in order to push the objects onto the shovel tool 218. Thus, the robotic device may be capable of moving heavier objects onto the shovel tool 218 when the leading edge of the shovel tool 218 includes the rollers.

A second end effector 230 may be attached to the second end of the second control arm linkage 224. The second end effector 230 may be at least one of a plurality of available end effectors including pinch grippers, suction grippers, forks/pitchforks, fork/pitchfork-like end effectors, shovels, shovel-like end effectors, excavator buckets, sweeping tools, pans, and specialized end effectors such as a thin film applicator/nozzle used to deposit a thin film onto a semiconductor substrate. The second end effector 230, just like the first end effector 218, may be modular, allowing different types of end effectors to be attached depending on the particular task performed by the robotic device 200.

The second end effector 230 may be connected to the control arm through rotational joint 226. Second end effector may be moved/actuated directly by rotating joint 226, indirectly by moving the control arm and/or the base linkage 210, or a combination thereof. In some embodiments, joint 226 may be a rigid connection between end effector 230 and the second control arm linkage 224 and, in this case, the second end effector 230 may be moved/actuated only indirectly via movement of the control arm (first control arm linkage 220 and second control arm linkage 224) and the base linkage 210.

As illustrated in FIG. 2, second end effector 230 may include more than one end effector. For example, second end effector 230 may include sweeping tool 228 and a gripper 232. The sweeping tool 228 may be mounted to the actuated rotational joint 226 at a first point on the joint 226. The gripper tool 232 may be mounted to the actuated rotational joint 226 at a second point on the joint 226. The first point and the second point may be approximately opposite to each other. In some embodiments, the first point and the second point may be separated by, for example, 30, 45, or 60 degrees.

Figure 7A:
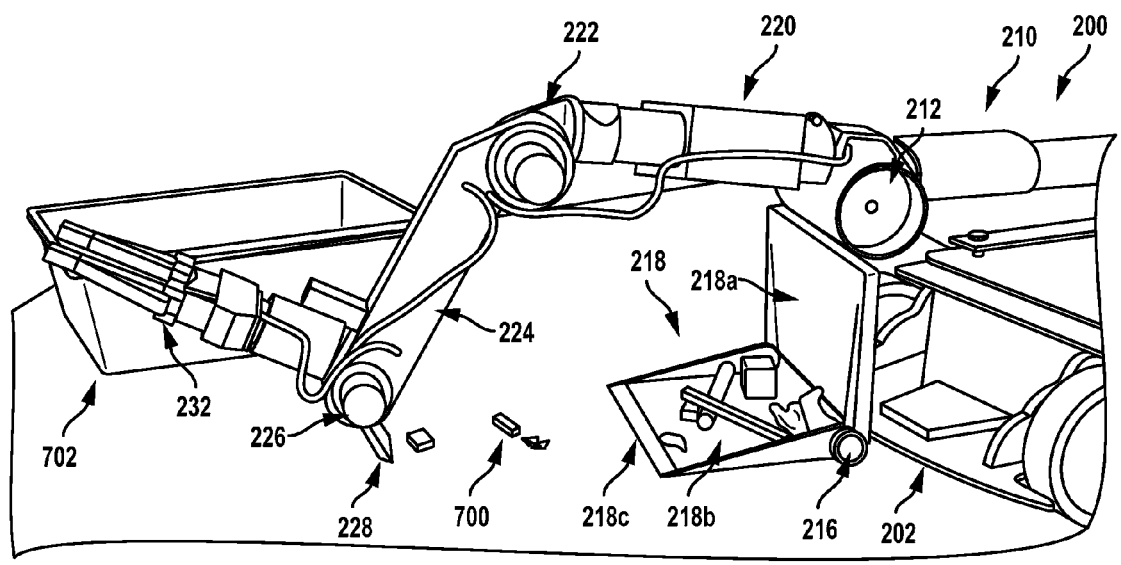
FIGS. 7A and 7B illustrate a robotic device sweeping objects onto a shovel tool, according to an example embodiment.
Figure 7B:
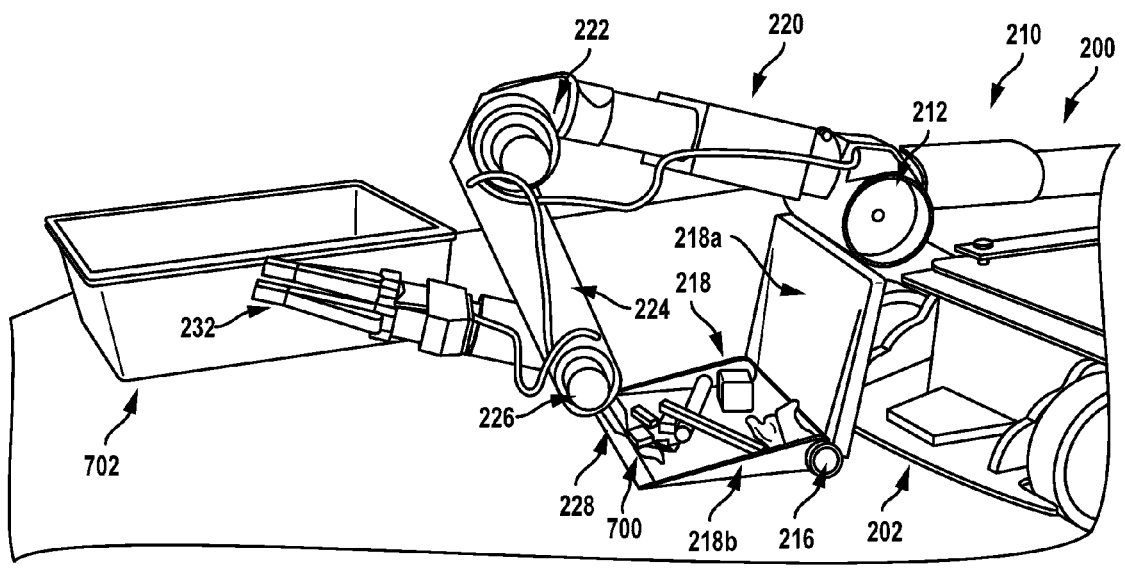
Figure 11A:
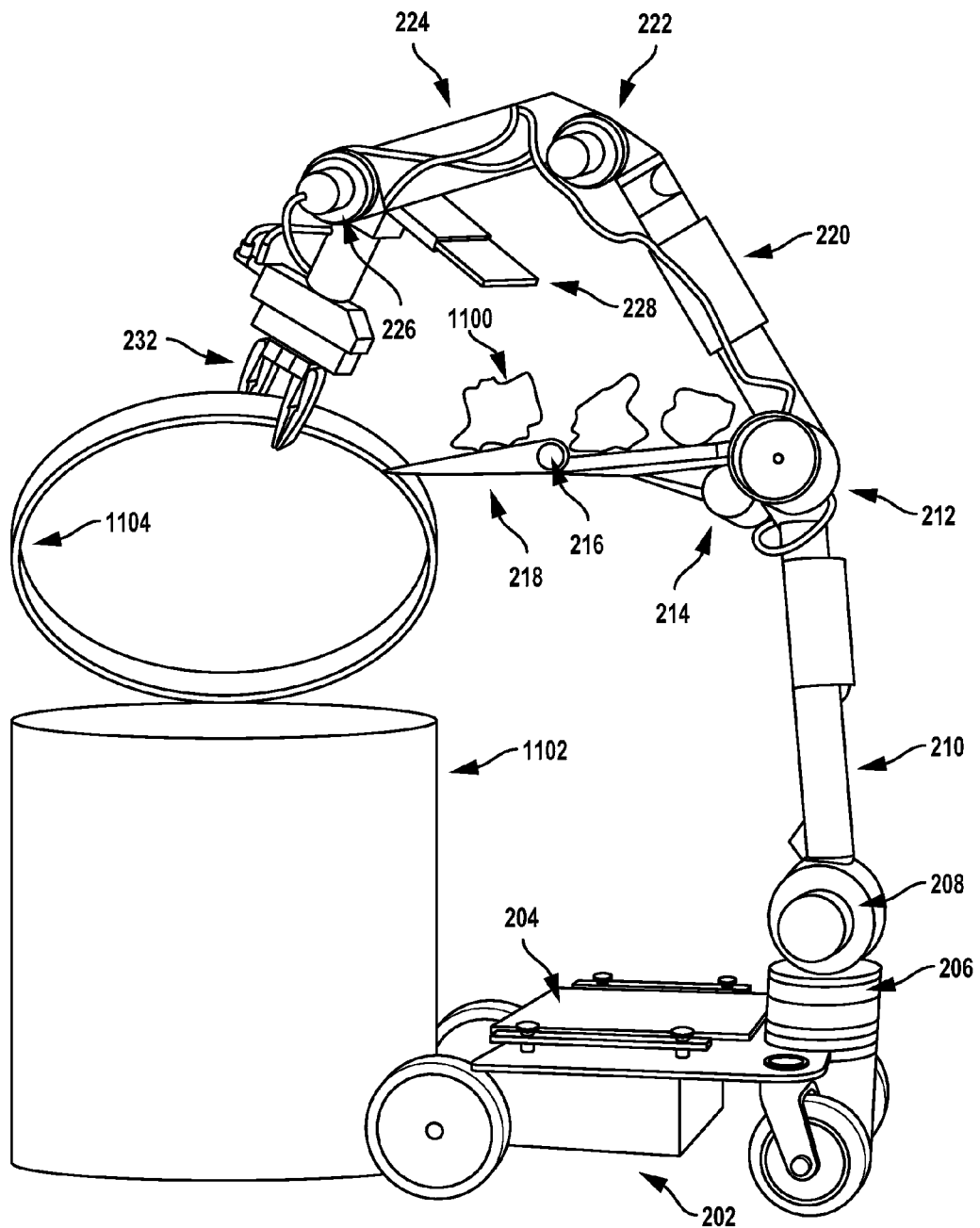
FIGS. 11A and 11B illustrate a robotic device using a gripper to open a garbage can, according to an example embodiment.
Figure 11B:
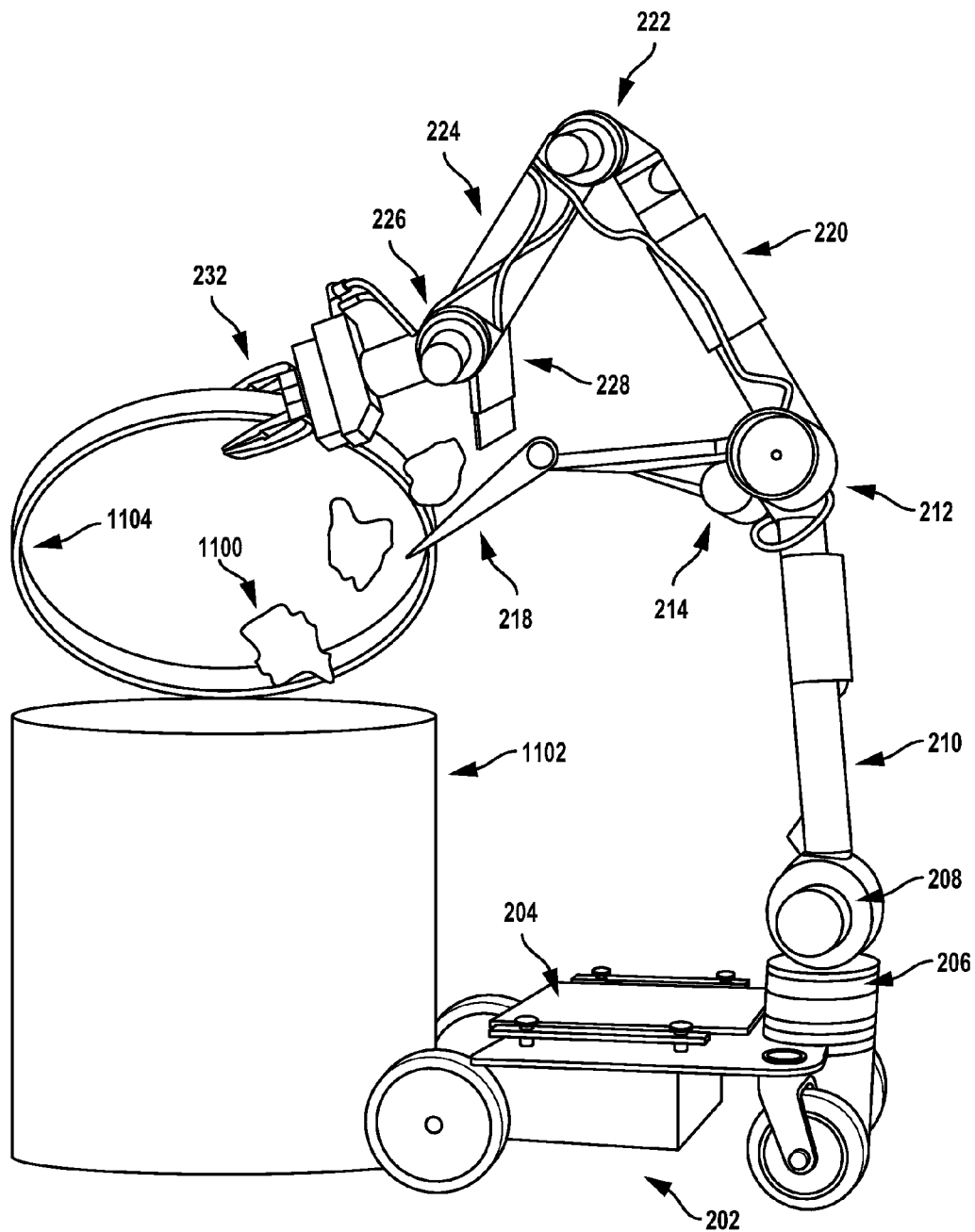

The degree of separation between the sweeping tool 228 and the gripper 232 may be chosen to allow interchangeable, alternating, and/or coordinated use of the sweeping tool 226 and the gripper 232. Alternating use may comprise, for example, moving the sweeping tool 228 into an operational position wherein the sweeping tool can be used to engage the shovel tool 218 and/or sweep an object onto the shovel tool 218, as illustrated in FIGS. 7A and 7B. Once the sweeping tool 228 has been used to operate on the object, the actuated rotational joint 226 may rotate, causing the sweeping tool 228 to move out of the operational position and the gripper 232 to move into the operational position, as illustrated in FIGS. 11A and 11B. While in the operational position, the gripper may be used to operate on the object or another object and/or perform other tasks that the gripper 232 is better adapted for than the sweeping tool 228.

The choice of the degree of separation between the attachment point of the sweeping tool 228 (the first point on the joint 226) and the attachment point of the gripper (the second point on the joint 226) may be driven by at least two considerations. Namely, the degree of separation may be influenced by a speed of alternating the end effectors and an amount of interference between the two end effectors. A small degree of separation such as 30 or 45 degrees may be used to decrease an amount of time it takes to move the end effectors 228 and 230 in and out of the operational position. A large degree of separation such as 90 degrees may be chosen to decrease an amount of interference between the gripper 232 and the environment and/or the object being operated on by the sweeping tool 228 while the sweeping tool 228 operates on the object, and vice versa. In some embodiments, the degree of separation between the sweeping tool 228 and the gripper 232 may be dynamically changed by having the sweeping tool 228 and the gripper 232 attached to different rotational joints (e.g., different coaxial rotational joints, not shown). The degree of separation may affect the ability of the robotic device 200 to fold into a compact, fully-folded conformation, as illustrated in FIGS. 3 and 4. The degree of separation may additionally affect the spatial footprint of the fully-folded conformation.

The sweeping tool 228 may comprise a plurality of compliant finger-like elements (e.g., bristles) arranged in at least one row and oriented parallel to a leading edge of the shovel tool 218 (e.g., the leftmost edge of the second shovel tool portion 218b, as shown in FIG. 2B). In other example embodiments, the sweeping tool 228 may comprise a squeegee rubber oriented parallel to the leading edge of the shovel tool 218. The compliant material of the sweeping tool may allow the robotic device to operate on delicate surfaces (e.g., sweep small toys or other small objects off delicate furniture and/or easily scratched flooring) without risk of damaging the surfaces. The compliant material additionally reduces the need for precise control of the sweeping action of the sweeping tool 228. The compliant material may conform to changes in height as the sweeping tool 228 moves from a surface of the environment onto the shovel tool 218. Thus, small errors in positioning of the sweeping tool 228 may be accounted for by the compliance of the sweeping tool 228.

The compliant material may be, for example, rubber, plastic, or another type of flexible polymeric material.

The bristles may be held in place by (the bristles may projected from) a rigid (e.g., metallic) frame 228*a*, as illustrated in FIG. 2B. The rigid frame may serve to attach the bristles to the rotational joint 226. The rigid frame may also be used in moving, lifting, and manipulating objects. For example, the robotic device 200 may use the rigid frame to pin/push an object against the shovel tool 218 or a portion thereof in order to grasp and subsequently lift the object (see FIG. 9). The object may be large enough or heavy enough such that the compliant bristles alone would bend or deform if the robot 200 attempted to use the bristles to pin the object against the shovel tool 218, thus preventing the robot 200 from successfully lifting and/or moving the object.

The gripper 232 may be a conventional pinch gripper having one set of opposing digits. In some embodiments, the gripper may be a three finger gripper, a four finger gripper, a five finger gripper designed to mimic the biomechanics of a human hand, and/or a suction gripper. The gripper 232 may be used to, for example, lift the lid off of a garbage can so that the robotic device may empty the contents of the shovel tool 218 into the garbage can (see FIGS. 11A and 11B). The gripper 232 may additionally be used to load objects onto the shovel tool 218, open doors, and move obstacles as the robotic device 200 is performing various household tasks in a house or apartment.

In addition to being configured to rotate about joint 226 (pitch rotation), the gripper 232 may be configured to rotate in at least one additional degree of freedom (e.g., roll rotation). In an example embodiment, when the gripper 232 is additionally configured for roll rotation, the gripper 232 can be rotated about the roll axis to adapt the gripper 232 to handle objects with of various shapes and/or having different geometric features. For example, in one orientation, the gripper 232 can be used to grasp a glass of water by the sides, by pinching the glass between the at least two fingers of the gripper 232. The gripper 232 can subsequently be caused to rotate by 90 degrees and be used to grasp a stack of papers by placing one finger underneath the stack and pushing on a top surface of the stack with the second finger. The number of degrees of freedom of the gripper 232 and/or similar end effectors may be based on a desired cost of the robotic device 200 and/or a desired set of functions that the robotic device 200 is expected to perform.

In some embodiments, the first end effector 218 and the second end effector 230 (e.g., sweeping tool 228 and gripper 232) may be modularized to allow the end effectors to be exchanged or swapped for different end effectors. The end effectors 218 and 230 may be swapped based on a task the robotic device 200 is expected or programmed to perform. For example, two-fingered gripper 232 may be swapped for a three-fingered gripper when the robotic device 200 is planned to pick up round objects that would be difficult to grasp with a two-fingered gripper. Similarly, shovel tool 218 may be swapped for a basket/container having a volume larger than a volume of the shovel tool 218 when the robotic device 200 is planned to move a plurality of objects over long distances. In general, the end effectors 218 and 230 may be swapped for any number of different end effectors including suction grippers, forks/pitchforks, fork/pitchfork-like end effectors, rakes, scoops, shovels, shovel-like end effectors, excavator buckets, sweeping tools, pans, and other specialized end effectors.

The process of swapping the end effectors 218 and 230 may be carried out by a docking station configured to detach a first (presently attached) end effector (e.g., pinch gripper) and attach a second end effector (e.g., suction). The docking station may be housed on the support base 202. Alternatively, the docking station may be external to robotic device 200. Robotic device 200 may be outfitted with specialized mechanisms that facilitate the process of attaching and detaching different end effectors. In some implementations, a standardized mechanical interface may be used across the plurality of different available end effectors to simplify the process of swapping between different end effectors.

C. Example Joint Configurations

In some embodiments, the joints 208, 212, 216, 222, and 226, shown in FIGS. 2A and 2B, may each be configured to rotate in or parallel to a particular plane. The joints 208, 212, 216, 222, and 226 may all be actuated rotational joints configured to move/rotate their respective linkages and end effectors in or parallel to the particular plane. Limiting each of the joints 208, 212, 216, 222, and 226 to always operate in or parallel to the same plane may allow the second end effector 230 to line up directly with the first end effector 218 (e.g., the sweeping tool 228 is configured to line up and engage with the shovel tool 218).

When the joint 206 rotates the base linkage 210 horizontally, from side to side (yaw rotation), the specific plane in which the base linkage 210 is allowed to move vertically, up and down (pitch rotation) with respect to the base 202, may change. However, as the base linkage 210 is rotated horizontally, from side to side (yaw rotation), the first end effector 218, the control arm (linkages 220 and 224), and the second end effector 230 will move with the base linkage 210 due to the mechanical interconnections of the respective components. Thus, any yaw rotation of the base linkage 210 translates directly into an equal amount of yaw rotation for all other components attached to the base linkage. Consequently, even though the specific plane of rotation may change, the base linkage 210, the first end effector 218, the control arm, and the second end effector 230 will continue to be confined to all move in or parallel to the same plane.

This limited range of motion of the joints 208, 212, 216, 222, and 226 (the joints always rotate in or parallel to the same plane) allows for the control system and control algorithms of the robotic device 200 to be simpler than those of, for example, a six-axis robot. The branching structure of the first end effector, the control arm, and the second end effector may improve the consistency of alignment between the first and second end effectors. Additionally, the limited number of degrees of freedom may reduce the cost of producing the robotic device 200 by reducing mechanical complexity and control software/hardware complexity. The reduced cost makes robotic device 200 more affordable for use as an aid in household tasks/chores (e.g., cleaning the house, doing laundry, throwing out the garbage) as well as certain commercial and/or industrial settings.

In some implementation, the joints 206, 208, 212, 216, 222, and 226 may be actuated by an electric motor mounted within and/or adjacent to the joints. The motor may be connected and may drive the respective joint and linkage through a gearbox. In example embodiments, the each of the joints and respective linkages may be driven by a harmonic drive system mounted within each joint. Mounting the drive mechanism inside the joint may decrease the amount of parts protruding from the robotic device 200, preventing the robot from snagging on furniture, curtains, and other household items as the robot moves around a home (reduces the likelihood of protruding parts hooking/colliding with another robot in a commercial or industrial setting). This approach may also result in a cleaner/sleeker-looking robot, making it a more visually appealing part of the house and thereby increasing its marketability to retail consumers. Alternatively, the joints and linkages of the robotic device may be driven/actuated by hydraulic and/or pneumatic pistons and/or actuators. The hydraulic or pneumatic actuators may be mounted across the respective joints to exert a moment about the joints.

Each of the joints 206, 208, 212, 216, 222, and 226 as well as any other joints that may be present on the example robotic device 200 may have mechanical, electrical, and/or software-maintained joint limits. For example, the range of motion of each joint may be limited by a mechanical hard stop that physically prevents the joint from rotating past certain limits. Similarly, electrical or software joint limits may be enforced by, for example, cutting power to the motor/actuator when a sensor (e.g., joint encoder) senses that a joint has exceeded a preset threshold. In some embodiments, the joint limits may be set to prevent parts of the robotic device 200 from colliding with each other or otherwise damaging the robot. For example, joints 212, 222, and 226 may have safety limits that prevent the control arm from causing the gripper 232 to collide with the shovel tool 218. In another example, joints 206 and 208 may be limited from moving the base linkage 210 to positions that would cause the robotic device 200 to tip over.

The joint limit of a first joint may be dynamically changed based on the position of at least one other joint of the robotic system 200. For example, when the gripper tool 232 is larger/longer than the sweeping tool 228, the amount of clearance between the shovel tool 218 and the sweeping tool 228 may be larger than the amount of clearance between the shovel tool 218 and the gripper 232. Thus, when the position of joint 226 indicates that the gripper 232 is in the operational position, the joints 212 and 222 may have more conservative joint limits (e.g., smaller allowable range of motion) than when the sweeping tool 228 is in the operational position. In another embodiment, when the robotic device 200 may determine that a rotation of the joint 226 would cause the sweeping tool 228 and/or the gripper 232 to collide with the shovel tool 218 based on the position of the second control arm linkage 224. A joint limit may be set for joint 226 to prevent the joint 226 from rotating the sweeping tool 228 and/or the gripper 232 into a position that would cause the sweeping tool 228 and/or the gripper 232 to collide with the shovel tool.

D. Example Folded Conformations of the Robotic Device

In some embodiments, the joints and linkages of the robotic device 200, illustrated in FIGS. 2A and 2B, may be interconnected in a way that allows robotic device 200 to fold into a compact form as illustrated in FIGS. 3 and 4. In particular, FIG. 3 illustrates the robotic device 200 in a half-folded conformation and FIG. 4 illustrates the robotic device 200 in a fully-folded conformation. In the fully-folded conformation shown in FIG. 4, the robotic device 200 may have a height that is about 25% of a fully unfolded, maximum height of the robotic device 200. A maximum height of the robotic device 200 may be, for example, 56 inches (142 centimeters). Folding into a compact form may reduce a "spatial footprint" of the robotic device 200. The spatial footprint may be defined as, for example, an amount of volume contained in a three-dimensional (3D) convex hull of the robotic device 200.

In practice, a smaller spatial footprint may make the robotic device 200 easier and/or more convenient to store. For example, in the configuration shown in FIG. 2A, the robotic device 200 may require a first extent of space (e.g., the volume of a 3D convex hull of the robotic device 200 in the conformation shown in FIG. 2A) to store (e.g., store the device in a closet, garage, pantry, warehouse, etc.). In the configuration shown in FIG. 3, the robotic device 200 may require a second extent of space to store, where the second extent is smaller than the first extent. Finally, in the configuration shown in FIG. 4, the robotic device 200 may require a third extent of space to store, where the third extent is smaller than the first extent and the second extent. Although the robotic device 200 may occupy the same amount of "true volume" (e.g., actual volume of the parts making up the robotic device 200) regardless of the orientation/positioning of the parts making up robotic device 200, the spatial footprint may be decreased as the robotic device 200 folds into a half-folded conformation and a fully-folded conformation. The robotic device 200 may be designed and/or built to fold into the compact forms (half-folded and fully-folded conformations) illustrated in FIGS. 3 and 4 due at least in part to the following features.

First, in some embodiments, the base linkage 210 may have a length such that when the base linkage 210 rests on top of the base 202 (the base linkage is "folded down," positioned tangentially to the base 202), the first end effector 218 (e.g., shovel tool 218) may be positioned in front of the mobile base 202 (as opposed to resting on top of the mobile base), as illustrated in FIGS. 3 and 4. In contrast, when base linkage 210 has a length such that base linkage 210 is not long enough for the first end effector 218 to be positioned in front of the mobile base 202, the first end effector 218 may rest on top of the mobile base, preventing the base linkage 210 (and thus the control arm) from entering the fully-folded conformation.

Second, in some embodiments, the first end effector 218 may be configured to fold into a compact form and/or may be positioned in a specific position/orientation. For example, in the compact form, the second portion 218b of the shovel tool 218 may be positioned adjacent and approximately parallel to the first portion 218a of the shovel tool 218, as illustrated in FIG. 4. Similarly, the first portion 218a of the shovel tool 218 may be oriented perpendicular to a surface the robotic device 200 is resting/operating on, as illustrated in FIGS. 3 and 4. In other example embodiments where the first end effector 218 is a different type of end effector (different from a shovel tool), folding into a compact form may comprise moving the first end effector into a specific position/orientation based on a shape and size of the first end effector. The spatial footprint of the robotic device 200 may be lower when the first end effector is in the specific position/orientation compared to another position/orientation.

Third, in some embodiments, the first control arm linkage 220 may be horizontally (in the x-direction) offset from the base linkage 210 in a direction perpendicular to the plane of rotation of the first control arm linkage 220 (the plane of rotation of the rotational joint 212). The first control arm linkage 220 may be offset by a first distance. The first distance may be such that the first control arm linkage 220 may be positioned approximately parallel (e.g., within 5 degrees of parallel) to the base linkage 210. The second end 220b of the first control arm linkage 220 may be positioned adjacent to the first end 210a of the base linkage 210 (where the first end 220a of the first control arm linkage 220 is connected to the second end 210b of the base linkage 210).

Fourth, in some example embodiments, the second control arm linkage 224 may be horizontally (in the x-direction) offset from the base linkage 210 in a direction perpendicular to the plane of rotation of the second control arm linkage 224 and/or the plane of rotation of the first control arm linkage 220 (the plane of rotation of the rotational joint 222 and/or the plane of rotation of the rotational joint 212, respectively). The second control arm linkage 224 may be offset by a second distance. The second distance may be such that the second control arm linkage 224 may be positioned approximately parallel (e.g., within 5 degrees of parallel) to the base linkage 210. The second end 224b of the second control arm linkage 224 may be positioned adjacent to the second end 210b of the base linkage 210 and adjacent to the first end 220a of the second control arm linkage 220 (where the first end 224a of the first control arm linkage 224 is connected to the second end 220b of the first control arm linkage 210).

In some example embodiments, the first distance (horizontal offset between first control arm linkage 220 and base linkage 210) and the second distance (horizontal offset between second control arm linkage 224 and base linkage 210) may be equal. The second control arm linkage 224 may be configured to, in the folded conformation, rest on top of the first control arm linkage 220 (as illustrated in FIG. 4) or underneath the first control arm linkage 220 (not shown). In other embodiments, the second distance may be different from the first distance. Thus, the second control arm linkage 224 may be configured to, in the folded conformation, rest adjacent to the first control arm linkage 220.

In other example embodiments, the control arm (first control arm linkage 220 and second control arm linkage 224) may be a single rigid linkage. For example, control arm linkages 220 and 224 may be rigidly connected at joint 222. The angle between the first control arm portion 220 and the second control arm portion 224 may be fixed at, for example, 30, 45, or 60 degrees, among other possible angles. In such example embodiments, folding into a compact form may comprise positioning the second end 224b of the second control arm portion 224 (second end of the control arm) adjacent to the second end 210b of the base linkage 210. Folding into a compact form may additionally comprise positioning at least one of the first control arm portion 220 and the second control arm portion 224 approximately parallel (e.g., within 5 degrees of parallel) to the base linkage 210.

Fifth, in some embodiments, the second end effector 230 may be configured to fold into a compact form and/or may be positioned in a specific position/orientation. For example, in the compact form, the gripper 232 may be positioned adjacent and approximately parallel to the second control arm portion 224, as illustrated in FIG. 4. The gripper 232 may be rotated into a particular conformation by rotating about any of the axes the gripper 232 is configured to rotate about (e.g., pitch axis, roll axis, yaw axis). Similarly, the sweeper tool 228 may be positioned adjacent and approximately parallel to the second control arm portion 224. In other example embodiments where the second end effector 230 is a different type of end effector (different from a gripper and/or sweeping tool) or where the second end effector 230 comprises more than one end effector, folding into a compact form may comprise moving the second end effector into a specific position/orientation based on a shape and size of the second end effector. The spatial footprint of the robotic device 200 may be lower when the second end effector is in the specific position/orientation compared to another position/orientation.

IV. EXAMPLE OPERATIONS OF THE ROBOTIC DEVICE

In some example embodiments, robotic device 200, illustrated in FIGS. 2A and 2B, and any portions thereof may be controlled by a control system to perform various operations, some of which are described herein by way of example. The robotic device 200 and/or the control system thereof may be programmed to perform the operations autonomously and/or under the control of an operator. For example, the robotic device 200 may be used as a household aid robot. Robotic device 200 may be programmed or controlled by a human user to carry out functions such as, for example, cleaning the house by collecting objects from a floor of the house, loading a clothes washer or clothes hamper with dirty laundry by collecting dirty clothes, linens, and/or towels from around the house, fetching the mail from a mailbox, tidying up the house by placing furniture such as chairs in their proper/desired positions, and/or taking the garbage to the curb on garbage pickup day. Other tasks and operations not explicitly described herein may also be possible.

The example robotic device 200 may be programmed or commanded to perform the tasks using a number of programming means including, but not limited to, a graphical user interface (GUI), voice command, and/or by labeling various objects around the house with barcodes (e.g., one-dimensional and/or two-dimensional barcodes), where the barcodes, when scanned by the robotic device 200, cause the robot to perform a specific operation on the labeled objects.

In some embodiments, the example robotic device 200 may be given specific commands and/or instructions such as a command to take a specific object to a specific location (e.g., "take the blue shirt to the laundry hamper" or "fetch the car keys from the living room"). In other embodiments, the example robotic device may be given general commands and/or instructions such as a general command to clean up the house (e.g., "load the laundry hamper with dirty laundry" or "find my car keys"). The robotic device 200 may utilize various machine learning algorithms in order to determine a sequence of steps to carry out the desired functions and operations. Machine learning algorithms may also be utilized to optimize the sequence of operations in order to reduce a length of time it takes the robotic device to carry out a particular command, function, operation, or task. For example, the robotic device 200 may learn where to search for dirty clothes by determining where members of the household are most likely to leave dirty clothes based on where, in the past, members of the household have left dirty clothes.

In example embodiments, the commands and/or instructions given to the robotic device 200 by a user (e.g., "load the laundry hamper with dirty laundry") may comprise or be deconstructed into a number of sub-commands or lower level operations that the robotic device 200 may take in order to perform the desired operation. For example, loading the laundry hamper with dirty laundry may comprise instructions that cause the robotic device 200 to use mobile base 202 to navigate the house/apartment while using sensors mounted on the robotic device 200 to scan the house for objects that may fall within the category of "dirty laundry."

When the robotic device locates an object that might be considered dirty laundry such as, for example, a shirt located on the floor of the house, the robotic device 200 may perform a more detailed analysis of the object in order to determine whether the shirt is clean or dirty. The robotic device 200 may use the first end effector 218 and/or the second end effector 230 to move the shirt in order to spread the shirt out on the floor. While the shirt is spread out on the floor, the robotic device 200 may perform additional scans of the shirt in order to determine whether the shirt has any stains. The robotic device 200 may be programmed to distinguish between design features of the shirt (e.g., a design that looks like it might be a stain) and true stains (e.g., food splattered on the shirt) by, for example, referencing an image of the shirt against a database of images of shirts (e.g., a database of images of the articles of clothing of members of the household).

The robotic device 200 may additionally flip the shirt to look for stains on the other side of the shirt. When the robotic device 200 determines that the shirt is dirty, the robotic device 200 may pick up the shirt using at least one of the first end effector 218 and the second end effector 230. While holding the shirt using at least one of the first end effector 218 and the second end effector 230, the mobile base 202 of the robotic device may move the robotic device 200 to the laundry hamper (the drop-off location). At the laundry hamper, the robotic device 200 may use at least one of the first end effector 218 and the second end effector 230 to place the shirt in the hamper.

The high-level tasks (e.g., load the washer with dirty laundry) performed by the robotic device 200 and/or the robotic arm thereof may be broken down into general operations that the robotic device 200 and/or the robotic arm thereof perform in order to accomplish the tasks. The general operations may be low-level operations/commands that make up more complex tasks. An example of a complex task may be grasping and moving an object. An example of a low-level operation may be actuating joint 226 for a specific period of time to rotate the end effector from a first orientation to a second orientation. Multiple low-level operations may be combined to cause robotic device 200 to carry out various complex tasks.

A. Coordinated Operations of First and Second End Effectors

Figure 5:
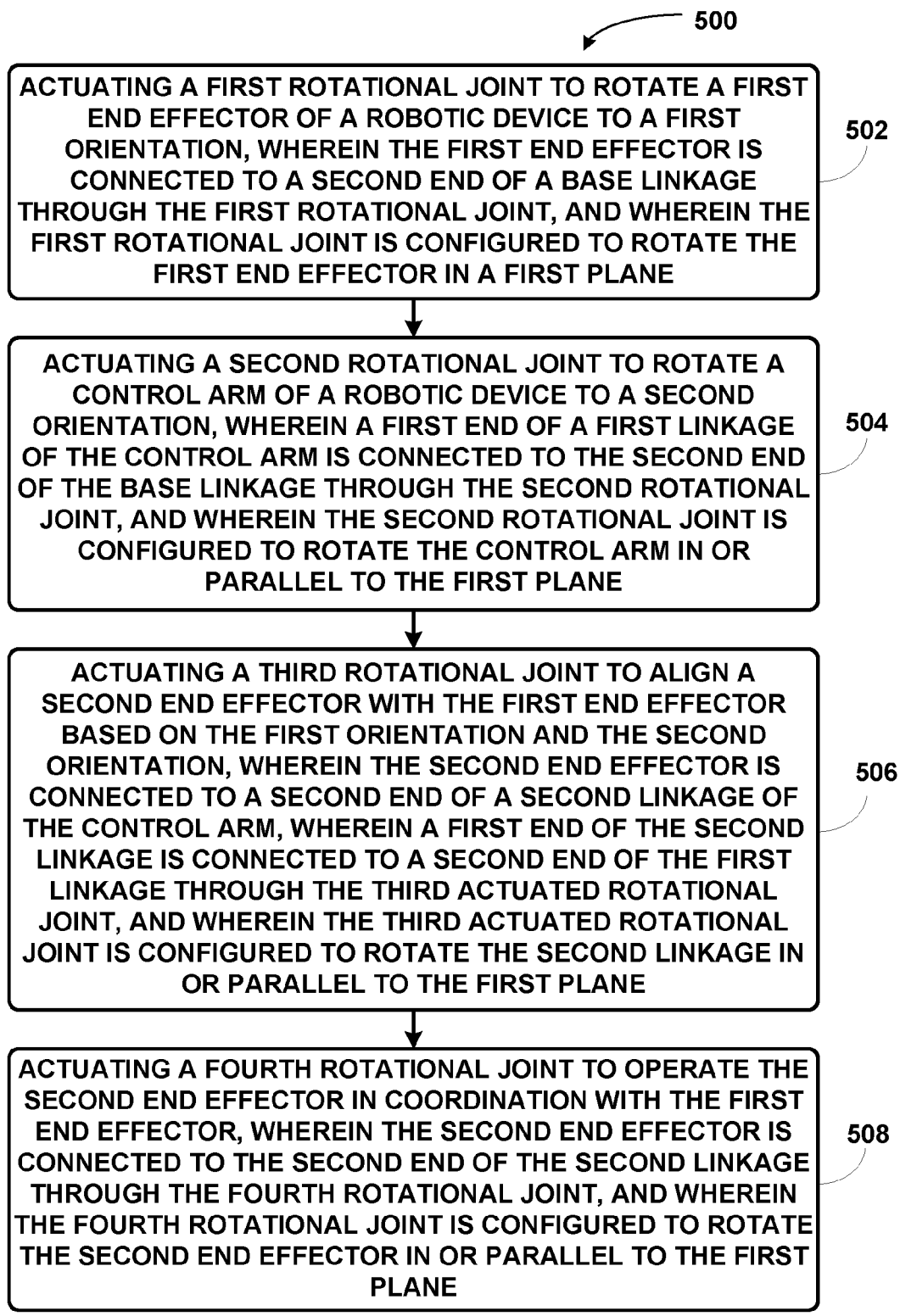
FIG. 5 illustrates another flow diagram of example operations, according to an example embodiment.

FIG. 5 illustrates a flow diagram 500 of operations that the robotic arm or example robotic device, as shown in FIGS. 2A and 2B, may perform. In block 502, a first rotational joint may be actuated to rotate a first end effector of a robotic device to a first orientation. The first end effector may be connected to a second end of a base linkage through the first rotational joint. The first rotational joint may be configured to rotate the first end effector in a first plane. The first end effector may be, for example, shovel tool 218, as illustrated in FIGS. 2A and 2B. The first end effector may be positioned in the first orientation in order to, for example, pick up an object or have an object placed thereon.

In block 504, a second rotational joint may be actuated to rotate a control arm of a robotic device to a second orientation. A first end of a first linkage of the control arm may be connected to the second end of the base linkage through the second rotational joint. The second rotational joint may be configured to rotate the control arm in or parallel to the first plane. The first linkage of the control arm may be linkage 220 of robotic device 200. Actuating the second rotational joint (e.g., joint 212) may move the entire control arm.

In block 506, a third rotational joint may be actuated to align a second end effector with the first end effector based on the first orientation and the second orientation. The second end effector may be connected to a second end of a second linkage of the control arm. A first end of the second linkage may be connected to a second end of the first linkage through the third actuated rotational joint. The third actuated rotational joint may be configured to rotate the second linkage in or parallel to the first plane. Actuating the third rotational joint (e.g., joint 222) may align the second end effector (e.g., sweeping tool 228) with the first end effector because the second end effector may be attached to the second end of the second linkage.

In block 508, a fourth rotational joint may be actuated to operate the second end effector in coordination with the first end effector. The second end effector may be connected to the second end of the second linkage through the fourth rotational joint. The fourth rotational joint may be configured to rotate the second end effector in or parallel to the first plane.

Actuation of the third rotational joint may be based on the first orientation (the orientation of the first end effector) because, in order to align the second end effector with the first end effector, the robotic device may use data indicating the position/orientation of the first end effector in determining a position to which the second end effector must be moved to align with the first end effector. Alternatively, data indicating the position/orientation of the first end effector may be used in determining a path along which to move the second end effector in order to align the second end effector with the first end effector.

Actuation of the third joint may also be based on the second orientation (the orientation of the control arm). Rotation of the second rotational joint may change the position/orientation of the first linkage. However, since the second linkage is connected to the first linkage, rotation of the second joint may also change the position of the second linkage. Further, since the second end effector is connected to the second end of the second linkage, rotation of the second joint may additionally affect the position of the second end effector. Thus, the second orientation may provide information about a current position of the second end effector, allowing actuation of the third joint to take into account the current position of the second end effector in aligning the second end effector with the first end effector. In other words, in order to coordinate the second end effector with the first end effector, the robotic device may consider the position and/or orientation of any joints or linkages that have an effect on the relative position/orientation of the first end effector and the second end effector.

In some embodiments, the robotic device may simultaneously (in parallel) coordinate the rotation of the first, second, and third joints in order to coordinate operations of the first end effector and the second end effector. For example, the second orientation and the rotation of the third rotational joint may be determined in parallel. The second orientation may depend on the planned rotation of the third joint, and vice versa.

Aligning the second end effector with the first end effector may also be referred to as bringing the second end effector into an operational position with respect to the first end effector. The operational position may vary and may depend on the particular type of end effectors of the robotic device as well as the task being performed by the robotic device. For example, when the first end effector is shovel tool 218 and the second end effector is sweeping tool 228, the operational position may comprise placing shovel tool 218 next to a first side of an object and placing the sweeping tool 228 on a side opposite the first side of the object. The sweeping tool 228 may then be moved or actuated by either the control arm or joint 226 to push the object onto the shovel tool. In another example, a welding robot may have as the first end effector a gripper/holder and as the second end effector a welding electrode holder/handle outfitted with a welding electrode. The first end effector may hold and/or position at least two pieces of metal to be welded together. Aligning the second end effector with the first end effector may involve bringing a tip of the electrode to a position/orientation where the welding process will start.

Operating the second end effector in coordination with the first end effector may include different patterns of motion depending on the specific types of end effectors as well as the particular task being performed by the robotic device. For example, when the robotic device is used as a household aid robot with the first end effector being shovel tool 218 and the second end effector being sweeping tool 228, operating the second end effector in coordination with the first end effector may involve actuating the fourth rotational joint to rotate the sweeping tool to push an object onto the shovel tool. In the example of the welding robot from above, operating the second end effector in coordination with the first end effector may involve actuating the fourth rotational joint to move the welding electrode along a desired welding path. In a further example, when the robotic arm is used in semiconductor manufacturing, the first end effector may be a photoresist spin-coating plate (rotating plate) and the second end effector may be a photoresist applicator or nozzle. The first end effector may be positioned in a first orientation to load a silicon wafer onto the spin plate. The photoresist applicator may be brought into proximity of the silicon wafer resting on the spin plate and may be centered with the silicon wafer. Operating the second end effector in coordination with the first end effector may comprise causing the photoresist applicator/nozzle to begin applying the photoresist when the spin plate reaches a predetermined rotational speed.

In some embodiments, operating the second end effector in coordination with the first end effector may additionally include actuating the first rotational joint, the second rotational joint, and the third rotational joint to move the corresponding linkages to perform a desired task. In the example of the welding robot, as the welding process proceeds, the welding electrode may be consumed. As the electrode is consumed, the robotic arm may need to continuously bring the second end effector closer to the first end effector in order to maintain contact between the welding electrode and the metal being welded. Another example of adjusting multiple joints while the second end effector is operating in coordination with the first end effector is described and illustrated with respect to FIGS. 9 and 10.

B. Example Coordinated Uses of Sweeping Tool and Shovel Tool

Figure 6:
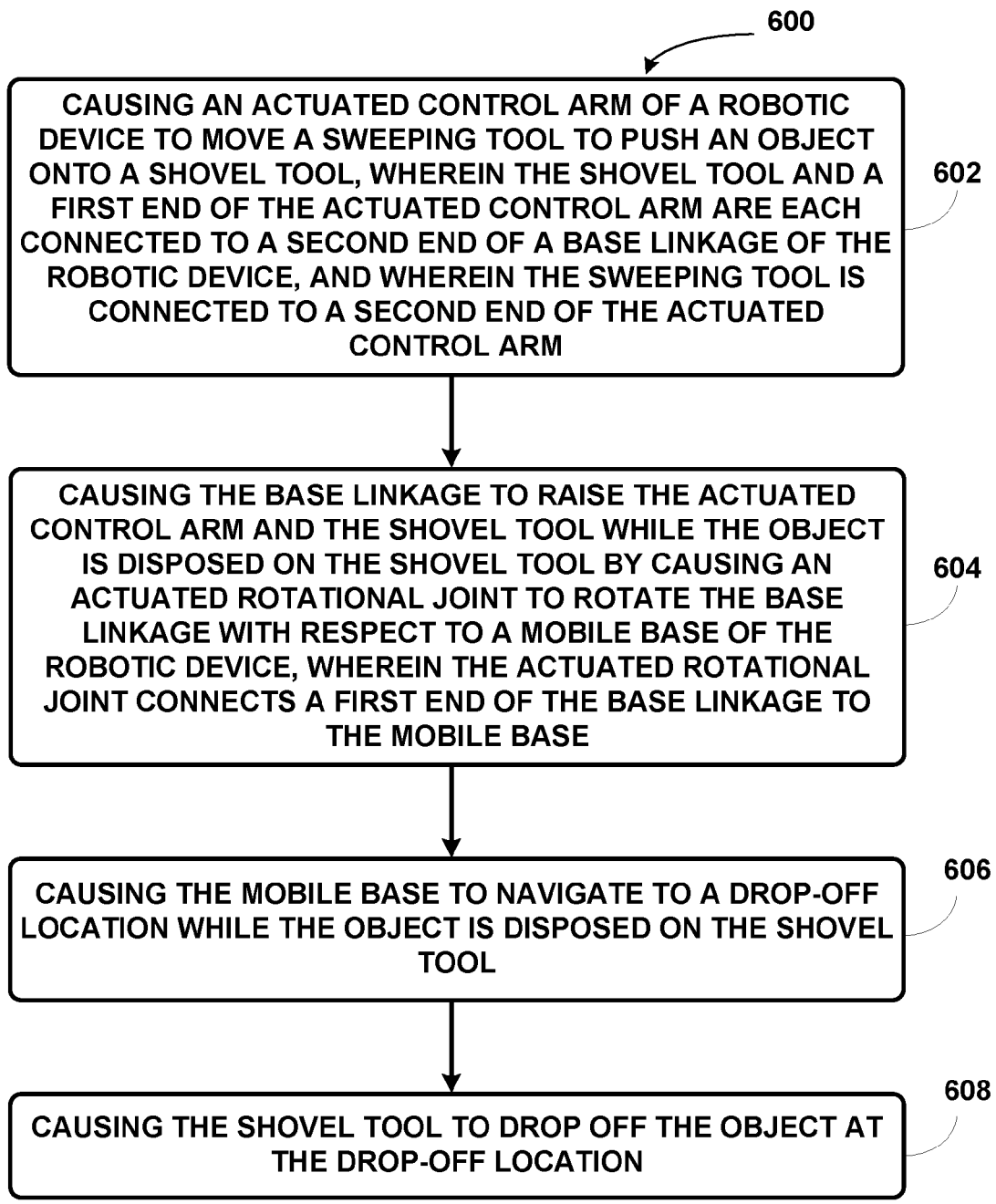
FIG. 6 illustrates another flow diagram of example operations, according to an example embodiment.

FIG. 6 illustrates another example flow diagram 600 including operations that may be performed by a robotic device such as example robotic device 200 of FIGS. 2A and 2B. In step 602, an actuated control arm of a robotic device may be caused to move a sweeping tool to push an object onto a shovel tool. The shovel tool and a first end of the actuated control arm may each be connected to a second end of a base linkage of the robotic device. The sweeping tool may be connected to a second end of the actuated control arm. The actuated control arm may be made up of first control arm linkage 220 and second control arm linkage 224, as shown in FIGS. 2A and 2B. The shovel tool may be, for example, shovel tool 218 connected to the second end 210b of base linkage 210. The sweeping tool may be sweeping tool 228.

In block 604 of FIG. 6, the base linkage may be caused to raise the actuated control arm and the shovel tool while the object is disposed on the shovel tool by causing an actuated rotational joint to rotate the base linkage with respect to a mobile base of the robotic device. The actuated rotational joint may connect a first end of the base linkage to the mobile base. The actuated rotational joint may be joint 208, as shown in FIGS. 2A and 2B. The joint 208 may produce a pitch rotation of the base linkage 210 with respect to the base, causing the vertical position of second end 210b of the base linkage 210 to increase. The vertical position of the actuated control arm and the shovel tool 218 may also increase since both are connected to the second end 210b of the base linkage 210. Raising the base linkage 210 (increasing a vertical position of the base linkage) may decrease an extent of horizontal area occupied by the robotic device 200, making it easier to maneuver the robotic device 200 around the environment.

In block 606, the mobile base may be caused to navigate to a drop-off location while the object is disposed on the shovel tool. For example, when the object disposed on the shovel tool is one or more small toys, the drop-off location may be a storage container (e.g., storage container 702 shown in FIGS. 7A and 7B) or area of the house specifically designated as storage space for the one or more small toys. The robotic device may be programmed with the drop-off location or may autonomously (e.g., via machine learning algorithms) learn that a particular container or location is the drop-off location for a particular class/type of objects (e.g., shoes go on the rack located next to the front door).

In block 608, the shovel tool may be caused to drop off the object at the drop-off location. For example, joint 216 may be actuated to move the second shovel tool portion 218b below the horizontal, causing the objects disposed thereon to slide off the shovel tool 218. Alternatively, in some embodiments, the control arm may actuate the sweeping tool 228 to sweep the objects disposed on shovel tool 218 off shovel tool 218. For example, when the one or more objects disposed on the shovel tool are delicate, tilting the second shovel tool portion 218b may result in the one or more objects breaking as they are dropped from shovel tool 218.

FIGS. 7A and 7B illustrate robotic device 200 performing the operations of block 602. Namely, actuated control arm (linkages 220 and 224) of example robotic device 200 is shown moving sweeping tool 228 to push object(s) 700 onto the shovel tool 218. The example robotic device 200 may be programmed to collect and organize small objects (e.g., small toys, cereal and/or other food dropped on the floor, etc.). Robotic device 200 may, autonomously or in response to commands from a user, search an area of interest (e.g., house, apartment, office, or portion thereof) for objects that match a particular criteria (e.g., scattered toys, dropped food). The robotic device may use a mobile base such as mobile base 202 to navigate through the area of interest.

Robotic device 200 may, based on sensor data received from one or more sensors, find/locate one or more object of interest 700 (e.g., toys, dropped food, dirty laundry). In response to locating the one or more objects of interest 700, the robotic device may use mobile base 202 to move the robotic device closer to the object(s) of interest 700. The robotic device may position the shovel tool 218 adjacent to the object(s) of interest 700, as illustrated in FIG. 7A. The second shovel tool portion 218b may be placed parallel or approximately parallel to the floor/base of the area of interest. A leading edge 218c of the shovel tool 218 may be oriented to face the objects 700.

The control arm (linkages 220 and 224) and the rotational joint 226 may move the sweeping tool 228 into a pre-sweep position (operational position as shown in FIG. 7A). The pre-sweep position may be such that the object(s) of interest 700 are located between the sweeping tool 228 and shovel tool 218, as shown in FIG. 7A (e.g., between a long edge of the sweeping tool 228 and the leading edge 218c of the shovel tool 218). The control arm may be caused to move the sweeping tool 228 from the pre-sweep position (operational position/orientation shown in FIG. 7A) towards the shovel tool 218, causing the sweeping tool to engage at least one of object(s) 700 and push the at least one of object(s) onto shovel tool 218 (e.g., onto second portion 218b of shovel tool 218), as shown in FIG. 7B. In general, object(s) 700 may vary in size. In some embodiments, the objects may be smaller, equal to, or larger in size than shovel tool 218, as is shown later herein.

The process of controlling sweeping tool 228 to move objects 700 onto shovel tool 218 may be of low computational complexity due to the shovel tool 218 and the sweeping tool 228 being limited to move in the same plane or in parallel planes. Limiting the movement of the two end effectors (218 and 228) to the same or parallel planes may ensure that the two end effectors can be reoriented into a preferred orientation for a particular task quickly and with reduced computational path planning overhead. For example, due to the joint structure of robotic device 200, the long edge of the sweeping tool 228 and the leading edge 218c of the shovel tool 218 may always be oriented parallel to each other. The parallel orientation may be a preferred orientation for the sweeping tool 228 and shovel tool 218 end effector pair.

In some embodiments and/or operations, if the sweeping tool 218 is not moved into the operational position by the control arm and/or rotational joint 226, the sweeping tool might not engage the at least one of object(s) 700 when moved by the control arm. The operational position may vary depending on the type of object being picked up or actuated and the type of end effectors used. In general, the operational position of a particular end effector or set of end effectors may be a position that, when the end effectors are actuated, results in the end effectors successfully operating on (e.g., moving, grasping, picking up, welding) an object of interest.

In some embodiments, the robotic device (e.g., robotic device 200) may determine that the one or more objects may be fragile or that the one or more objects may belong to a class of fragile objects by, for example, referencing the one or more objects against a database of objects that are expected to be encountered by the robot in a particular setting (e.g., house, apartment, office, back yard, warehouse).

When the robotic device determines that the one or more objects are not fragile (e.g., clothes, plastic toys, items intended to be thrown away), the robotic device may minimize an amount of time it takes to unload/drop off the one or more objects by tilting the shovel tool 218, thereby causing the one or more objects to fall off the shovel tool 218 and land at or near the drop-off location. When the robotic device determines that the one or more objects are fragile (e.g., raw egg, expensive decorative piece, drinking glass, silicon wafer), the robotic device may minimize a likelihood of damaging the one or more objects as follows. First, the robotic device may cause the base linkage 210 to bring the shovel tool 218 closer to the ground/floor of the environment/drop-off location (lower the shovel tool 218 toward the ground/floor, thereby decreasing a vertical distance between the ground/floor and the shovel tool 218). Second, the robotic device may cause the control arm (e.g., linkages 220 and 224) to move the sweeping tool 228 to push the one or more objects off of the shovel tool 218 and into/onto the drop-off location, thereby reducing the risk of damaging the one or more objects.

C. Example Coordinated Lift Operations

Figure 8:
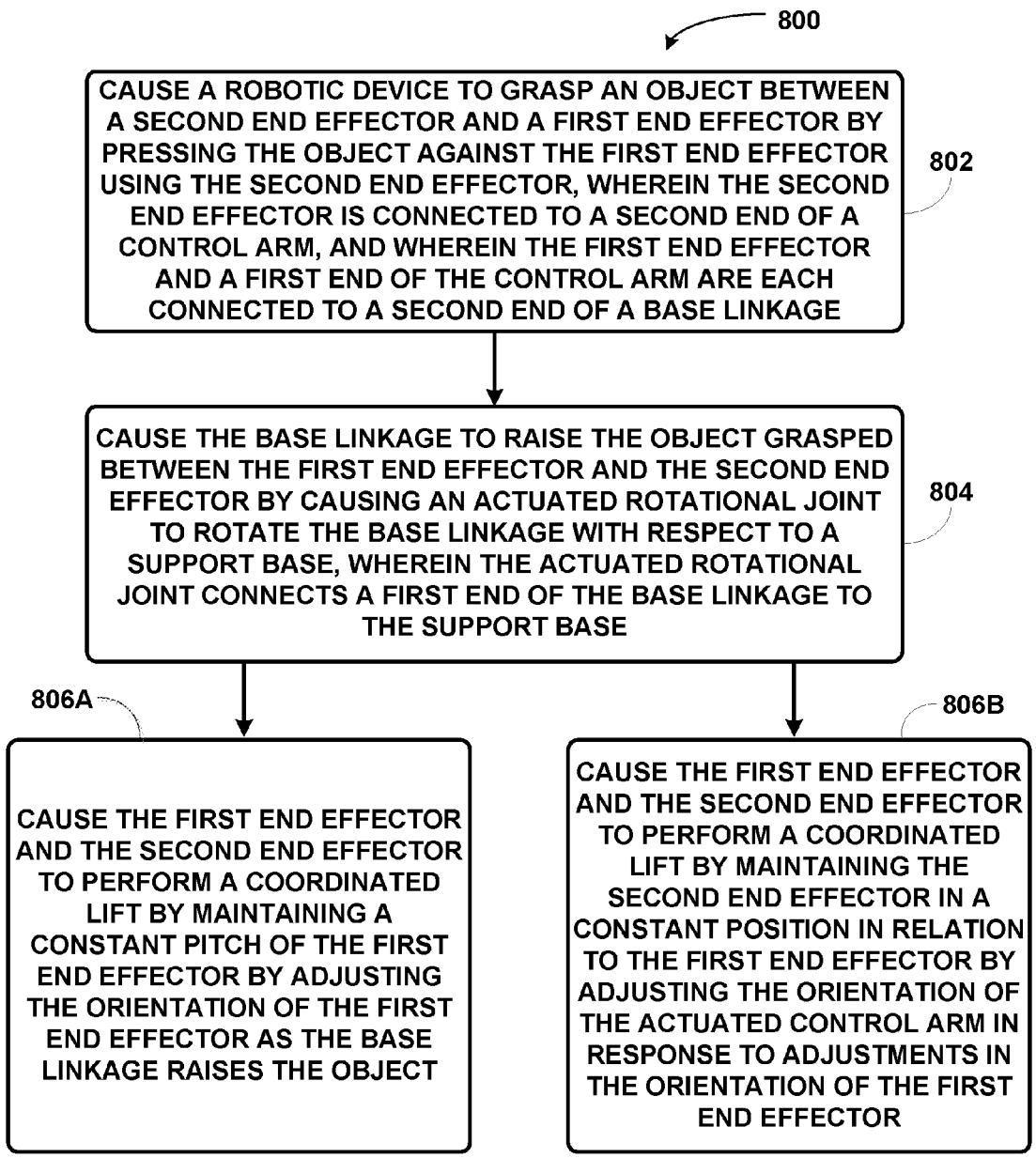
FIG. 8 illustrates another flow diagram of example operations, according to an example embodiment.

FIG. 8 shows flow diagram 800 that comprises additional or alternative operations that may be performed by a robotic device such as example robotic device 200 shown in FIGS. 2A and 2B. In block 802, a robotic device may be caused to grasp an object between a second end effector and a first end effector by pressing the object against the first end effector using the second end effector. The second end effector may be connected to a second end of a control arm. The first end effector and a first end of the control arm may each be connected to a second end of a base linkage. In some examples, the first end effector may be shovel tool 218. The second end effector may be sweeping tool 228 and/or gripper 232.

In block 804, the base linkage may be caused to raise the object grasped between the first end effector and the second end effector by causing an actuated rotational joint to rotate the base linkage with respect to a support base. The actuated rotational joint may connect a first end of the base linkage to the support base. The support base may be a fixed/stationary anchor point about which the robotic device may operate. Alternatively, the support base may be mobile base 202.

In blocks 806A and 806B, the second end effector and the first end effector may be caused to perform a coordinated lift while moving the object. Specifically, in block 806A, the robotic device may maintain a constant pitch of the first end effector by adjusting the orientation of the first end effector as the base linkage raises the object. In block 806B, the robotic device may maintain the second end effector in a constant position in relation to the first end effector by adjusting the orientation of the actuated control arm in response to adjustments in the orientation of the first end effector. In some embodiments, when the second end effector is connected to the control arm through a second actuated rotational joint (e.g., joint 226), maintaining the second end effector in a constant position in relation to the first end effector may further include rotating the second actuated rotational joint in response to adjustments in the orientation of the first end effector.

In some example embodiments, grasping an object between the first end effector and the second end effector may comprise pushing (pinning) the object against the first end effector by causing the control arm to push the object against the first end effector with the second end effector. For example, the robot 200 may be used to pick up a compliant/soft object (e.g., pillow, shirt, linens, stuffed animal, shop rags) by using the sweeping tool 228 to push the complaint object against the shovel tool 218. Depending on the shape, size, and/or other properties of the object, the sweeping tool 228 may push the object against the first portion 218a of the shovel tool 218 or against the second portion 218b of the shovel tool. In some embodiments, the amount of force applied by the sweeping tool to the object may depend on properties of the object, including, but not limited to, size, shape (geometric features), mass, density, and/or fragility.

Figure 9:
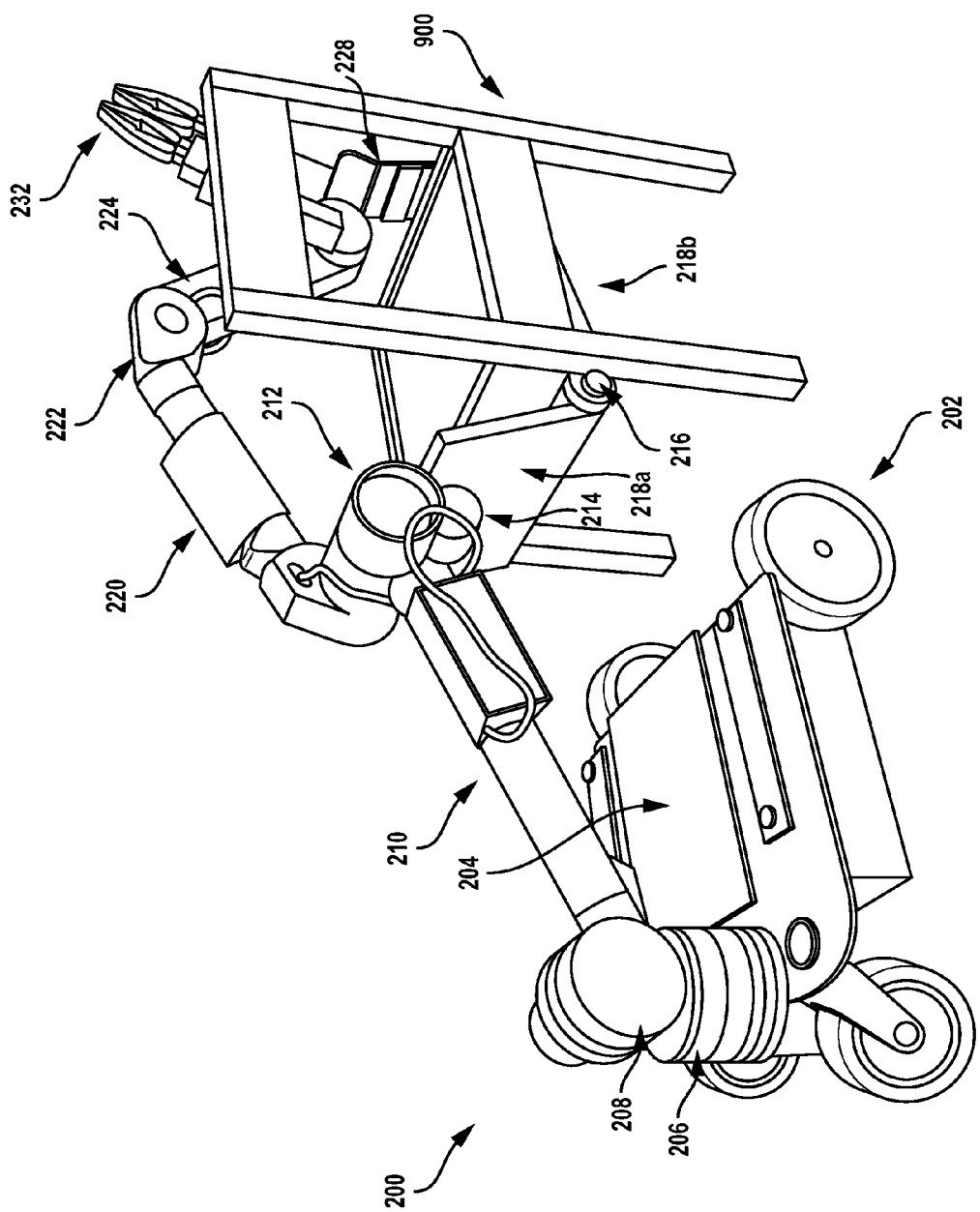
FIG. 9 illustrates a robotic device lifting and moving a chair, according to an example embodiment.

In other embodiments, grasping an object may comprise using the first end effector to support the object while using the second end effector to stabilize the object. For example, FIG. 9 illustrates robotic device 200, as illustrated in FIGS. 2A and 2B, lifting chair 900. Robotic device 200 may place shovel tool 218 (second portion 218b of the shovel tool) underneath the seat of the chair 900 in order to support the weight of the chair 900. The robotic device 200 may also use the second end effector, namely the sweeping tool 228, to stabilize the chair 900 by pushing the chair 900, using the sweeping tool 228, against the first shovel tool portion 218a, thereby applying forces counteracting any gravitational and/or inertial forces that may cause the chair 900 to slide or fall off the shovel tool 218.

Figure 10:
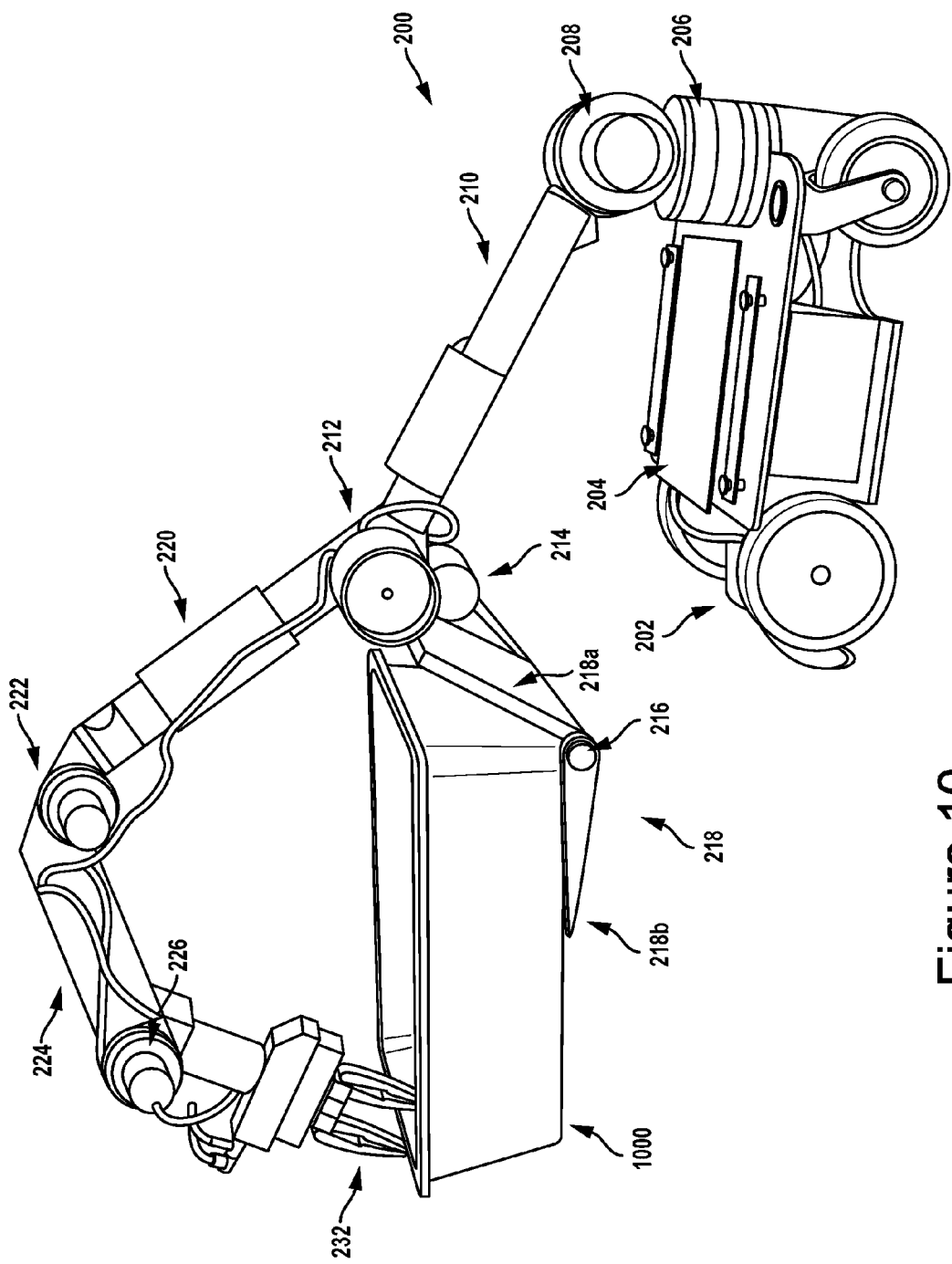
FIG. 10 illustrates a robotic device lifting and moving a container, according to an example embodiment.

FIG. 10 illustrates another example embodiment where a robotic device 200, as illustrated in FIGS. 2A and 2B, may use a first end effector to support an object while using a second end effector to stabilize the object as the object is being lifted. Specifically, FIG. 10 shows robotic device 200 holding container/box 1000 using the shovel tool 218 and gripper 232. Robotic device 200 may place shovel tool 218 (second portion 218b of the shovel tool) underneath the bottom of the container/box 1000 in order to support the weight of the container/box 1000. The robotic device 200 may also use the second end effector, namely the gripper 232, to stabilize the container 1000 by gripping an edge/side of the container 1000, thereby preventing any gravitational and/or inertial forces from causing the container 1000 to slide or fall off the shovel tool 218. The gripper 232 may additionally be used to push the container 1000 against the first shovel tool portion 218a as part of the stabilizing operation.

In some embodiments, the robotic device may be programmed to decide how to pick up an object (e.g., sweep the object onto the shovel tool, grasp the object between the first end effector and the second end effector, support the object on the first end effector while stabilizing with the second end effector) based on the properties of the object (e.g., size, shape, mass, density, fragility). The robotic device may determine or estimate the properties of the object using one or more sensors mounted on the robotic device and/or in the environment occupied by the robotic device. For example, shape and geometric features may be determined based on data received from a vision sensor (e.g., camera, LIDAR). Mass may be determined or estimated based on a load measured on the actuators configured to actuate the joints of robotic device 200 (e.g., joints 208, 212, 216, 222, and 226). Fragility may be estimated by referencing an image of the object against a database of relevant objects (e.g., common household objects may be considered relevant when the robot is used as a household aid robot).

In the case illustrated in FIGS. 7A and 7B, robotic device 200 may determine that small objects 700 are small enough to place onto the shovel tool 218. Robotic device 200 may be further determine that sweeping the small objects 700 onto the shovel tool 218 may be faster than individually loading the small objects 700 onto the shovel tool 218 using the gripper 232. Thus, the robotic device may use the sweeping tool 228 to push the small objects 700 onto shovel tool 218.

In the example of FIG. 9, robotic device 200 may determine that chair 900 is too large to be fully supported on the shovel tool 218 in a stable manner. Robotic device 200 may further determine that chair 900 does not contain any features that may be securely gripped by gripper 232. However, robotic device 200 may also determine that chair 900 may be secured in place using the sweeping tool 228 while a portion of chair 900 rests on the sweeping tool 218 (specifically, the second portion 218b). Specifically, chair 900 may be secured in place by placing the rigid portion of the sweeping tool 228 underneath the seat on the side opposite to the side that is supported by shovel tool 218, as shown in FIG. 9. Thus, robotic device 200 may use the shovel tool 218 and sweeping tool 228 to grasp and move the chair.

Finally, in the example of FIG. 10, robotic device 200 may be configured to determine that container 1000 is too large to be fully supported on the shovel tool 218 in a stable manner. Robotic device 200 may further determine that although the container 1000 may be secured in place using sweeping tool 228, the sweeping tool 228 may lose grip of the edge of the container 1000 (the sweeping tool 228 may slip over the edge, leaving container 1000 unsecured) as the robotic device 200 experiences disturbances (e.g., a person accidentally bumps into the robotic device 200, the robotic device 200 drives over uneven terrain) while moving container 1000. Robotic device 200 may further determine that gripper 232 may be used to securely (more securely than sweeping tool 228) grasp the side of the container 1000. Thus, robotic device 200 may use the shovel tool 218 and the gripper 232 to lift and move the container 1000.

Performing a coordinated lift, as illustrated in block 806A and 806B of FIG. 8, may keep level the object(s) being lifted, thereby preventing the objects from tipping, sliding about, and/or spilling the contents of any container being lifted. For example, if, while lifting container 1000, as illustrated in FIG. 10, the robotic device 200 did not perform a coordinated lift but instead only caused the base linkage 210 to tilt upwards about joint 208 (e.g., into approximately the position illustrated in FIG. 2B), some contents of container 1000 may be spilled out once the robotic arm reaches the position illustrated in FIG. 2B. In other words, as the base linkage 210 is tilted up, the relative position and orientation between the base linkage 210, the first and effector 218, the control arm (linkages 220 and 224), and the second end effector (gripper 232) would remain unchanged during an uncoordinated lift. Thus, the container 1000 would not be kept level during the uncoordinated lift. The container 1000 may eventually be brought into an orientation where the container 1000 may be perpendicular to the orientation shown in FIG. 10, thus allowing contents of the container 1000 to spill out of the container 1000.

In contrast, while performing a coordinated lift, a pitch of the container 1000 may be kept constant (e.g., the container may be kept level) by adjusting the position/orientation of the shovel tool 218 is response to movements of the base linkage 210. For example, as the base linkage tilts up (as the base linkage 210 rotates clockwise about joint 208), the shovel tool 218 (e.g., the second shovel tool portion 218b) may be caused to tilt down (second shovel tool portion 218b may rotate counterclockwise about joint 216). The net effect of the clockwise rotation of base linkage 210 about joint 208 and counterclockwise rotation of the second shovel tool portion 218b about joint 216 may result in a pitch of the second shovel tool portion 218b remaining constant. Thus, the pitch of the container 1000 may also remain constant. In some embodiments, a constant pitch of the shovel tool 218 may be maintained by adjusting the portion/orientation of both the first shovel tool portion 218a and the second shovel tool portion 218b.

In some embodiments, the coordinated lift may further comprise maintaining the second end effector (e.g., gripper 232) in a constant position in relation to the first end effector (e.g., the shovel tool 218). The constant position of the gripper 232 may be maintained by adjusting the position/orientation of the control arm in response to movements and adjustments of the orientation/position of the shovel tool 218. In other embodiments, the constant position of gripper 232 may additionally be maintained by rotating the gripper about joint 226 in response to movements and adjustments of the orientation/position of the shovel tool 218. The gripper 232 may be maintained in a constant orientation with respect to the shovel tool in order to maintain a firm grip on the edge/side of the container 1000.

The shovel tool 218 and the gripper 232 may move in continuous synchrony. Thus, the operations of blocks 806A and 806B may be performed in parallel. For example, every time the position of the shovel tool 218 increases by 1 cm in the y-direction, the position of the gripper 232 may simultaneously be increased by 1 cm in the y-direction. In contrast, if the movement of the shovel tool 218 and the gripper 232 were not synchronized, the shovel tool 218 may move first, followed by a delay, followed by a corresponding movements of the gripper 232. The delay in movement between the shovel tool 218 and the gripper 232 may result in the gripper 232 losing grip on the edge of container 1000. Thus, moving the shovel tool 218 and the gripper 232 with minimum delay (e.g., synchronously) between movement of the shovel tool 218 and the gripper 232 may increase the reliability with which the robotic device 200 picks up, holds, moves, and drops off objects.

V. EXAMPLE OPERATIONS OF MULTIPLE END EFFECTORS

In some embodiments, the second end effector 230 may comprise both a sweeping tool 228 and gripper 232. The sweeping tool 228 and the gripper 232 may be used in an alternating manner or in combination to perform a particular task. Interchangeable use of the sweeping tool 228 and the gripper 232 may be accomplished by rotating the sweeping tool and the gripper 232 in and out of an operational position using actuated rotational joint 226, as previously described.

FIGS. 11A and 11B illustrate an example embodiment where the sweeping tool 228 and the gripper tool 232 are used in combination. As previously discussed, robotic device 200 may load onto the shovel tool at least one object by, for example, using the sweeping tool 228 to sweep the at least one object onto the shovel tool 218. FIG. 11A shows objects 1100 loaded onto the shovel tool. The objects 1100 may have been loaded onto the shovel tool in a manner similar to that described with respect to objects 700 in FIGS. 6A and 6B. Objects 1100 may be, for example, clumps of paper or tissue. Robotic device 200 may have found objects 1100 around the house in response to being commanded to clean up the house. Robotic device 200 may have determined the objects 1100 to be garbage.

After loading the objects 1100 onto the shovel tool, robotic device 200 may move to a drop-off location. The drop off location for objects 1100, determined to be garbage, may be a garbage/trash can 1102. Garbage can 1102 may have thereon a lid 1104. In order to place the objects 1100 into garbage can 1102, the robotic device 200 may need to remove the lid 1104 of the garbage can. In order to remove the lid 1104, the robotic device 200 may cause gripper 232 to move into an operational position. The operational position may be a position that allows the gripper 232 to grasp the lid 1104, as illustrated in FIG. 11A. The gripper 232 may be opened and the control arm (linkages 220 and 224) along with the base linkage 210 may be moved to lower the gripper 232 onto a rim of the lid 1104. The gripper 232 may subsequently be closed, gripping lid 1104. The control arm and the base linkage 210 may be actuated, causing the lid 1104 held by the gripper 232 to be lifted off the garbage can 1102.

In some examples, the lid 1104 may be removed completely and may be placed on the ground next to the garbage can 1102. In other examples, the lid 1104 may be connected to the garbage can 1102 by a hinge. The hinged lid 1104 may be supported in the open position and prevented from closing using the gripper 232, the shovel tool 218, the control arm, the base linkage 210, or any combination or portion thereof. For example, the shovel tool 218 may be moved into a position where a side of the shovel tool 218 supports the hinged lid 1104 in an open position.

Once the lid 1104 is lifted and/or supported in the open position, the rotational joint 226 may be caused to rotate, moving gripper 228 out of the operational position and moving sweeping tool 228 into the operational position, as shown in FIG. 11B. With the garbage can lid 1104 open, sweeping tool 228 and shovel tool 218 may be actuated to cause the objects 1100 to be unloaded from the shovel tool 218 and loaded into the garbage can 1102. In some implementations, the shovel tool 218 may be caused to tilt forward, causing the objects 1100 to slide off the shovel tool 218. In other implementations, the sweeping tool 228 may be used to sweep the objects 1100 off the shovel tool 218. Using the sweeping tool 228 to remove the objects may be particular useful when, for example, the shovel tool 218 contains multiple objects intended to be delivered to different locations. For example, one object may need to be dropped off at garbage can 1102 while another object may be, for example, a toy that may need to be dropped off in a toy chest at a different location.

VI. CONCLUSION

As previously discussed, the complexity of the control system configured to control the robotic device 200 may be reduced when the joints 208, 212, 216, 222, and/or 226 are configured to rotate in or parallel to the same plane. Rotation in or parallel to the same place results in the corresponding linkages 210, 220, and 224 as well as the corresponding end effectors 218 and 228/232 also moving in or parallel to the same plane. Thus, a control system of the robotic device 200 may need to consider fewer degrees of freedom in determining a plan to perform a desired action than, for example, a six axis robotic device.

For example, when coordinating the motion of the shovel tool 218 and sweeping tool 228, the control system may need to consider only the rotational position (pitch) of the sweeping tool 228 with respect to the shovel tool 218 (e.g., rotational position of joint 226) and the linear distance between the sweeping tool 228 and the shovel tool 218. Since the robotic arm may be confined to planar motion, the linear distance and the motion path for traversing the linear distance may be fully expressed in two dimensions (e.g., y-position and z-position). In contrast, a linear distance between the end effectors of two different six axis robotic arms may need to be expressed in three dimensions (e.g., x-position, y-position, and z-position). Additionally, there may be multiple redundant ways to actuate the joints of a six axis robotic arm to reach a particular position. Thus, robotic device 200 may be easier to program/control (2D motion planning) than a more complex robotic device (e.g., six axis robot requiring 3D motion planning) and may consequently be more affordable to use as, for example, a household aid robot.

Further, configuring the joints 208, 212, 216, 222, and/or 226 to move in or parallel to the same plane may additionally reduce the cost of manufacturing the robotic device 200. Joints having more than one degree of freedom may be more expensive due to their increased mechanical complexity. Similarly, adding a greater number of one degree of freedom joints in order to, for example, allow for redundancy in motion (e.g., more than one way to actuate the joints and move the linkages to reach a specific location) may not increase the per-joint cost but may nonetheless increase the cost of the robotic device due to the added cost of the additional joints.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A robotic arm comprising:
   a base linkage having a first end and a second end;
   a first end effector connected to the second end of the base linkage through a first rotational joint configured to allow the first end effector to rotate in a first plane; and
   a control arm comprising:
      a first linkage having a first end and a second end, the first end of the first linkage connected to the second end of the base linkage through a second rotational joint configured to allow the first linkage to rotate in or parallel to the first plane;
      a second linkage having a first end and a second end, the first end of the second linkage connected to the second end of the first linkage through a third rotational joint configured to allow the second linkage to rotate in or parallel to the first plane; and
      a second end effector connected to the second end of the second linkage through a fourth rotational joint configured to allow the second end effector to rotate in or parallel to the first plane.

2. The robotic arm of claim 1, wherein at least one of the first actuated rotational joint, the second actuated rotational joint, the third actuated rotational joint, and the fourth actuated rotational joint is actuated by a harmonic drive mounted within the joint.

3. The robotic arm of claim 1, further comprising a control system configured to:
   provide instructions to actuate the first rotational joint to rotate the first end effector to a first orientation;
   provide instructions to actuate the second rotational joint to rotate the control arm to a second orientation;
   provide instructions to actuate the third rotational joint to align the second end effector with the first end effector based on the first orientation and the second orientation; and
   provide instructions to actuate the fourth rotational joint to operate the second end effector in coordination with the first end effector.

4. The robotic arm of claim 1, wherein:
   the control arm is offset from the base linkage in a direction perpendicular to the first plane by a first distance to allow the robotic arm to fold into a compact form, wherein folding into a compact form comprises:
   positioning the first linkage parallel to the base linkage such that the second end of the second linkage is positioned adjacent to the first end of the base linkage; and
   positioning the second linkage parallel to the base linkage and the first linkage such that the second end of the second linkage is positioned adjacent to the first end of the first linkage and the second end of the base linkage; and
   the robotic arm is controlled by a control system configured to provide instructions to cause the robotic arm to fold into the compact form.

5. The robotic arm of claim 1, wherein the first end of the base linkage is connected to a support base through a fifth actuated joint configured to move the base linkage with at least one degree of freedom.

6. The robotic arm of claim 5, wherein the robotic arm is controlled by a control system configured to:
   provide instructions to cause the control arm to move the second end effector to grasp an object between the second end effector and the first end effector by pressing the object against the first end effector using the second end effector;

provide instructions to cause the base linkage to move the object grasped between the second end effector and the first end effector to a drop-off location by causing the fifth actuated joint to move the base linkage with the at least one degree of freedom; and provide instructions to cause the control arm to move the second end effector to release, at the drop-off location, the object grasped between the second end effector and the first end effector.

7. The robotic arm of claim 5, wherein the robotic arm is controlled by a control system configured to:

provide instructions to actuate the first rotational joint to rotate the first end effector to a first orientation;

provide instructions to actuate the second rotational joint to rotate the control arm to a second orientation;

provide instructions to actuate the third rotational joint to align the second end effector with the first end effector based on the first orientation and the second orientation; and provide instructions to actuate the fourth rotational joint to operate the second end effector in coordination with the first end effector;

provide instructions to actuate the fifth actuated joint to move the base linkage with the at least one degree of freedom;

provide instructions to maintain a constant pitch of the first end effector by adjusting the orientation of the first end effector as the base linkage is moved with the at least one degree of freedom; and provide instructions to maintain the second end effector in a constant position in relation to the first end effector by adjusting the orientation of the control arm in response to adjustments in the orientation of the first end effector.

8. The robotic arm of claim 5, wherein the robotic arm is controlled by a control system configured to:

provide instructions to cause the control arm to move the second end effector to push an object onto the first end effector;

provide instructions to cause the base linkage to move the object disposed on the first end effector to a drop-off location by causing the fifth actuated joint to move the base linkage with the at least one degree of freedom; and provide instructions to cause the first end effector to drop off, at the drop-off location, the object disposed on the first end effector.

9. The robotic arm of claim 1, wherein the base linkage comprises an actuated telescopic linkage configured to extend a length of the base linkage.

10. The robotic arm of claim 9, wherein the first end of the base linkage is connected to a base through a fifth actuated joint configured to move the base linkage with at least one degree of freedom; and wherein the robotic arm is controlled by a control system configured to:

provide instructions to cause the control arm to move the second end effector to grasp an object between the second end effector and the first end effector by pressing the object against the first end effector using the second end effector;

provide instructions to cause the base linkage to move the object to a drop-off location while the object is grasped between the second end effector and the first end effector by:

causing the fifth actuated joint to move the base linkage with the at least one degree of freedom; and causing the actuated telescopic linkage to extend the length of the base linkage in order to reach the drop-off location; and provide instructions to cause the control arm to move the second end effector to release, at the drop-off location, the object grasped between the second end effector and the first end effector.

11. The robotic arm of claim 1, wherein:
the first end effector is a shovel tool;
the second end effector is a sweeping tool; and
the robotic arm is controlled by a control system configured to provide instructions to cause the sweeping tool to move an object onto the shovel tool.

12. The robotic arm of claim 1, wherein:
the first end effector is a storage container;
the second end effector is a gripper; and
the robotic arm is controlled by a control system configured to provide instructions to cause the gripper to pick up an object and place the object in the storage container.

13. The robotic arm of claim 1, wherein the robotic arm is controlled by a control system configured to determine a range of motion limit of at least one of the first rotational joint, the second rotational joint, the third rotational joint, and the fourth rotational joint based on a position of at least one of the base linkage, the first linkage, the second linkage, the first end effector, and the second end effector.

14. The robotic arm of claim 13, wherein the robotic arm is controlled by a control system configured to determine a range of motion limit of the fourth rotational joint based on a position of the second end of the second linkage with respect to the first end effector.

15. A method comprising:
actuating a first rotational joint to rotate a first end effector of a robotic device to a first orientation, wherein the first end effector is connected to a second end of a base linkage through the first rotational joint, and wherein the first rotational joint is configured to rotate the first end effector in a first plane;

actuating a second rotational joint to rotate a control arm of a robotic device to a second orientation, wherein a first end of a first linkage of the control arm is connected to the second end of the base linkage through the second rotational joint, and wherein the second rotational joint is configured to rotate the control arm in or parallel to the first plane;

actuating a third rotational joint to align a second end effector with the first end effector based on the first orientation and the second orientation, wherein the second end effector is connected to a second end of a second linkage of the control arm, wherein a first end of the second linkage is connected to a second end of the first linkage through the third actuated rotational joint, and wherein the third actuated rotational joint is configured to rotate the second linkage in or parallel to the first plane; and actuating a fourth rotational joint to operate the second end effector in coordination with the first end effector, wherein the second end effector is connected to the second end of the second linkage through the fourth rotational joint, and wherein the fourth rotational joint is configured to rotate the second end effector in or parallel to the first plane.

16. The method of claim 15, wherein a first end of the base linkage is connected to a support base through a fifth actuated joint configured to move the base linkage with at least one degree of freedom, the method further comprising:

causing the fifth actuated joint to move the base linkage with the at least one degree of freedom;

maintaining a constant pitch of the first end effector by adjusting the orientation of the first end effector as the base linkage is moved with the at least one degree of freedom; and maintaining the second end effector in a constant position in relation to the first end effector by adjusting the orientation of the control arm in response to adjustments in the orientation of the first end effector.

17. The method of claim 15, wherein the control arm is offset from the base linkage in a direction perpendicular to the first plane by a first distance to allow the robotic arm to fold into a compact form, the method further comprising causing the robotic arm to fold into a compact form, wherein folding into a compact form comprises:

positioning the first linkage parallel to the base linkage such that the second end of the second linkage is positioned adjacent to the first end of the base linkage; and positioning the second linkage parallel to the base linkage and the first linkage such that the second end of the second linkage is positioned adjacent to the first end of the first linkage and the second end of the base linkage.

18. The method of claim 15, wherein actuating the fourth rotational joint to operate the second end effector in coordination with the first end effector comprises rotating the second end effector to grasp an object between the second end effector and the first end effector by pressing the object against the first end effector using the second end effector, the method further comprising:

actuating a fifth actuated joint to move the base linkage in order to move the object grasped between the second end effector and the first end effector to a drop-off location, wherein the fifth actuated joint connects the first end of the base linkage to a support base; and causing the control arm to move the second end effector to release, at the drop-off location, the object grasped between the second end effector and the first end effector.

19. The method of claim 15, wherein the base linkage comprises an actuated telescopic linkage configured to extend a length of the base linkage.

20. A robotic device comprising:

a mobile base;

a base linkage having a first end and a second end, the first end of the base linkage connected to the mobile base;

a first end effector connected to the second end of the base linkage through a first rotational joint configured to allow the first end effector to rotate in a first plane; and a control arm comprising:

a first linkage having a first end and a second end, the first end of the first linkage connected to the second end of the base linkage through a second rotational joint configured to allow the first linkage to rotate in or parallel to the first plane;

a second linkage having a first end and a second end, the first end of the second linkage connected to the second end of the first linkage through a third rotational joint configured to allow the second linkage to rotate in or parallel to the first plane; and a second end effector connected to the second end of the second linkage through a fourth rotational joint configured to allow the second end effector to rotate in or parallel to the first plane.

* * * * *